(12) United States Patent
Sameshima et al.

(10) Patent No.: US 11,991,731 B2
(45) Date of Patent: May 21, 2024

(54) WIRELESS STATION, DATA AGGREGATION STATION, WIRELESS SYSTEM, TRANSMISSION CONTROL METHOD FOR WIRELESS STATION, TRANSMISSION CONTROL METHOD FOR DATA AGGREGATION, CONTROL CIRCUIT, AND NON-TRANSITORY STORAGE MEDIUM

(71) Applicant: MITSUBISHI ELECTRIC CORPORATION, Tokyo (JP)

(72) Inventors: Keiko Sameshima, Tokyo (JP); Tetsuya Aoyama, Tokyo (JP); Keijiro Take, Tokyo (JP); Yusuke Kinoshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 17/354,249

(22) Filed: Jun. 22, 2021

(65) Prior Publication Data

US 2021/0314970 A1 Oct. 7, 2021

Related U.S. Application Data

(63) Continuation of application No. PCT/JP2019/006386, filed on Feb. 20, 2019.

(51) Int. Cl.
*H04W 72/54* (2023.01)
*H04W 40/22* (2009.01)
(Continued)

(52) U.S. Cl.
CPC ........... *H04W 72/54* (2023.01); *H04W 40/22* (2013.01); *H04W 72/0453* (2013.01); *H04W 72/541* (2023.01)

(58) Field of Classification Search
CPC ............... H04W 72/54; H04W 72/541; H04W 72/0453; H04W 40/22
See application file for complete search history.

(56) References Cited

U.S. PATENT DOCUMENTS

| 7,356,010 B2 | 4/2008 | He et al. |
| 2009/0075588 A1 | 3/2009 | Zhu et al. |

(Continued)

FOREIGN PATENT DOCUMENTS

| EP | 1 804 442 A1 | 7/2007 |
| JP | 2004-187297 A | 7/2004 |

(Continued)

OTHER PUBLICATIONS

Extended European Search Report for European Application No. 19916391.6, dated Jan. 31, 2022.

(Continued)

*Primary Examiner* — Justin Y Lee
(74) *Attorney, Agent, or Firm* — Birch, Stewart, Kolasch & Birch, LLP

(57) ABSTRACT

Provided are: a sending/receiving unit to receive data frames sent from another wireless station and receivable, the receivable data frames including a first data frame that is a relay target; an interference time storage unit to store an interference time that is a time from when the sending/receiving unit starts receiving each of the data frames to when the sending/receiving unit terminates receiving the data frame; a waiting time determination unit to determine a waiting time on a basis of the interference time; a frame generation unit to generate a second data frame by changing a destination of the first data frame to a data aggregation station that aggregates the data frames or to a wireless station that serves as (Continued)

a relay destination; and a transmission control unit to wait for the waiting time and cause the sending/receiving unit to send the second data frame.

25 Claims, 17 Drawing Sheets

(51) Int. Cl.
*H04W 72/0453* (2023.01)
*H04W 72/541* (2023.01)

(56) References Cited

U.S. PATENT DOCUMENTS

2012/0307673 A1* 12/2012 Chang ................ H04W 72/542 370/336

2018/0145743 A1  5/2018 Murakami et al.

FOREIGN PATENT DOCUMENTS

| JP | 2011-135155 A | 7/2011 |
| JP | 2013-26655 A | 2/2013 |

OTHER PUBLICATIONS

European Office Action dated Nov. 24, 2022 for Application No. 19 916 391.6.

Indian Office Action for Indian Application No. 202147028491, dated Mar. 8, 2022, with English translation.

* cited by examiner

WIRELESS STATION, DATA AGGREGATION STATION, WIRELESS SYSTEM, TRANSMISSION CONTROL METHOD FOR WIRELESS STATION, TRANSMISSION CONTROL METHOD FOR DATA AGGREGATION, CONTROL CIRCUIT, AND NON-TRANSITORY STORAGE MEDIUM

CROSS-REFERENCE TO RELATED APPLICATION

This application is a continuation application of International Application PCT/JP2019/006386, filed on Feb. 20, 2019, and designating the U.S., the entire contents of which are incorporated herein by reference.

BACKGROUND OF THE INVENTION

1. Field of the Invention

The disclosure relates to a wireless station, a data aggregation station, a wireless system, a transmission control method for a wireless station, and a transmission control method for a data aggregation station in a system that aggregates data from target devices, to a control circuit, and to a non-transitory recoding medium.

2. Description of the Related Art

In recent years, attention has been focused on device status monitoring through wireless multi-hop networks. For such networks, it is necessary to control the timing at which each wireless station sends information, so as to avoid interference between wireless stations. The technique disclosed in Patent Literature 1 is that a wireless multi-hop network made up of one base station and a plurality of wireless stations allows wireless stations not interfering with one another to simultaneously relay frames for improved frequency reuse efficiency. In Japanese Patent Application Laid-open No. 2013-26655, the base station adjusts the interval between frame transmissions to control the timing at which the wireless stations relay frames.

For the above-mentioned conventional technique, the base station controls the timing at which each wireless station relays frames. This is problematic because each wireless station cannot autonomously avoid interference between wireless stations in correspondence to the communication state.

The disclosure has been made in view of the above, and an object thereof is to obtain a wireless station capable of autonomously avoiding interference between wireless stations during frame relay.

SUMMARY OF THE INVENTION

To solve the problem and achieve the object, a wireless station according to the disclosure comprising: a sending/receiving unit to receive data frames sent from another wireless station and receivable, the receivable data frames including a first data frame that is a relay target; an interference time storage unit to store an interference time that is a time from when the sending/receiving unit starts receiving each of the data frames to when the sending/receiving unit terminates receiving the data frame; a waiting time determination unit to determine a waiting time on a basis of the interference time; a frame generation unit to generate a second data frame by changing a destination of the first data frame to a data aggregation station that aggregates the data frames or to a wireless station that serves as a relay destination; and a transmission control unit to wait for the waiting time and cause the sending/receiving unit to send the second data frame.

DETAILED DESCRIPTION OF THE PREFERRED EMBODIMENTS

Hereinafter, a wireless station, a data aggregation station, a wireless system, a transmission control method for a wireless station, and a transmission control method for a data aggregation station according to embodiments of the disclosure will be described in detail with reference to the drawings. The disclosure is not limited to the embodiments.

First Embodiment

Figure 1:
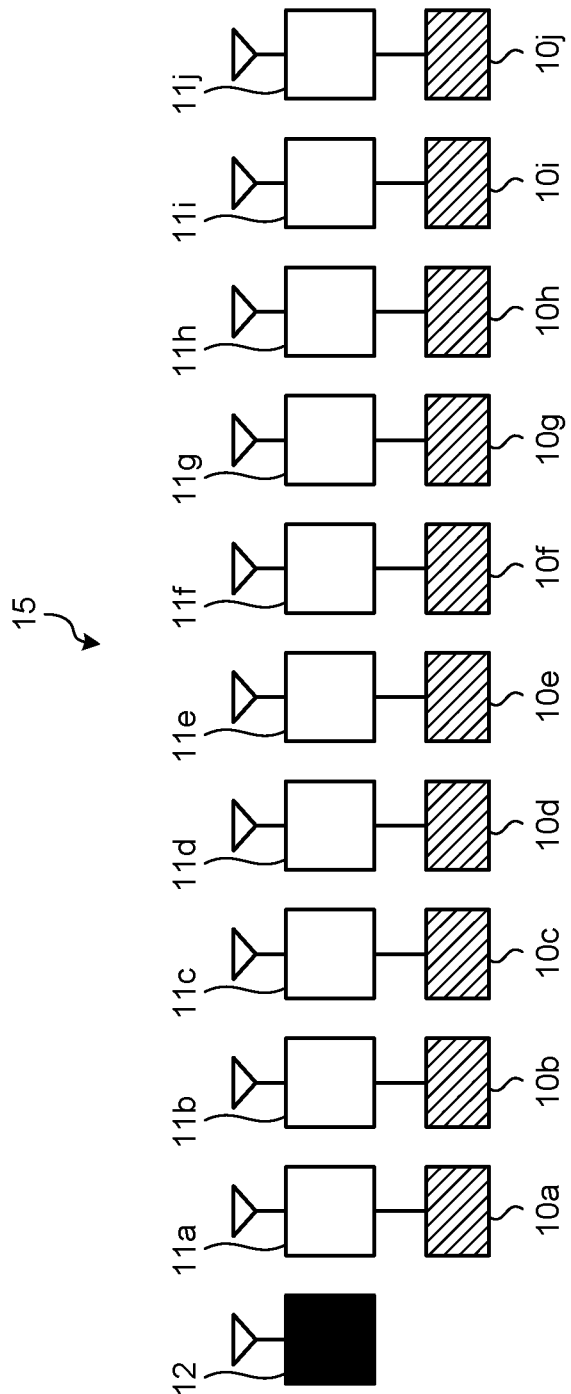
FIG. 1 is a diagram illustrating an exemplary configuration of a wireless system according to a first embodiment.

FIG. 1 is a diagram illustrating an exemplary configuration of a wireless system 15 according to the first embodiment of the disclosure. The wireless system 15 includes target devices 10a to 10j, wireless stations 11a to 11j, and a data aggregation station 12.

The target devices 10a to 10j periodically generate data. The target devices 10a to 10j are each directly connected to the corresponding one of the wireless stations 11a to 11j, and periodically output data to the corresponding wireless stations 11a to 11j. The target devices 10a to 10j are sensors, and data are measurement values measured by the target devices 10a to 10j, for example, but the disclosure is not limited thereto. In the following description, the target devices 10a to 10j may be referred to as the target device(s) 10.

The wireless stations 11a to 11j are wireless devices each of which periodically acquires data from the corresponding one of the target devices 10a to 10j. The wireless stations 11a to 11j generate data frames using the acquired data, and send the data frames toward the data aggregation station 12. In the following description, the wireless stations 11a to 11j may be referred to as the wireless station(s) 11.

The data aggregation station 12 is a wireless device that receives data frames from the wireless stations 11a to 11j. The data aggregation station 12 aggregates the data frames from the wireless stations 11a to 11j, restores data from the data frames, and stores the data.

In the wireless system 15, the wireless stations 11a to 11j are arranged to provide a linear route so that each wireless station 11 relays data frames sent from the other wireless stations 11 when not sending its own data frames. In the wireless system 15, data frames are transmitted in the direction from the wireless station 11j to the data aggregation station 12. It should be noted that each wireless station 11 has information on, for example, an adjacent wireless station 11 on the linear route. For example, the wireless station 11d receives a data frame from the wireless station 11e and sends the data frame to the wireless station 11c. The wireless station 11a receives a data frame from the wireless station 11b and sends the data frame to the data aggregation station 12. The wireless system 15 allows for the circumstance in which two or more of the wireless stations 11a to 11j send data frames simultaneously and, as a result, interference occurs between the wireless stations 11 during the relay of the data frames.

Figure 2:
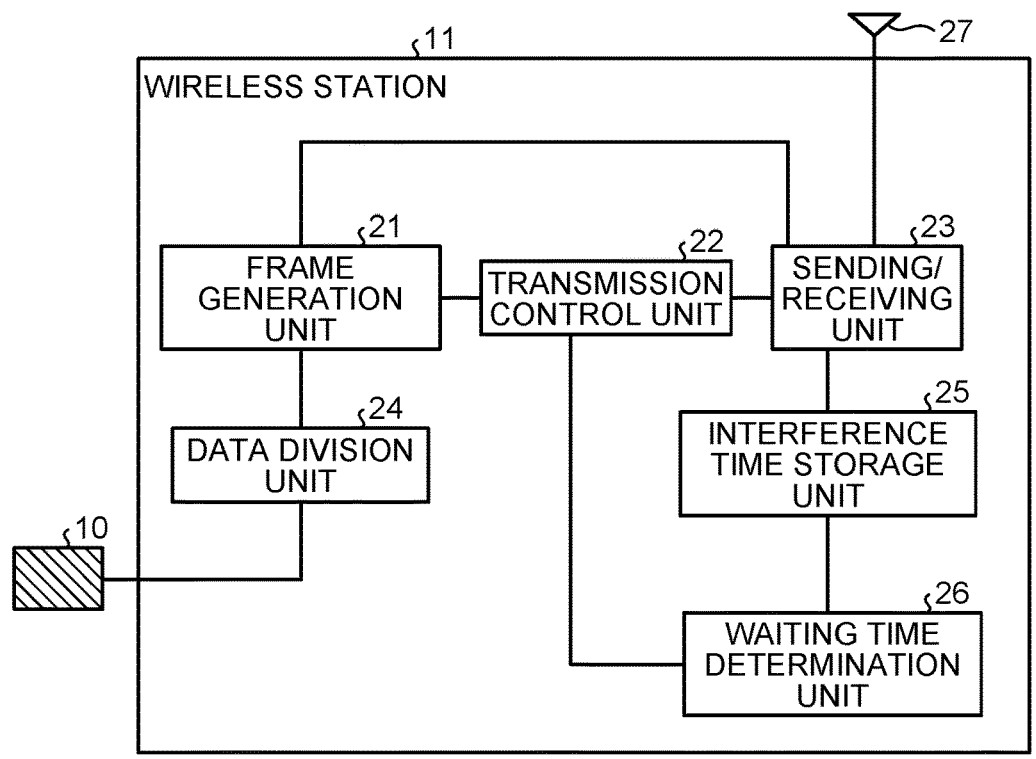
FIG. 2 is a block diagram illustrating an exemplary configuration of a wireless station according to the first embodiment.

The configuration of the wireless station 11 will be described. FIG. 2 is a block diagram illustrating an exemplary configuration of the wireless station 11 according to the first embodiment. The wireless station 11 includes a frame generation unit 21, a transmission control unit 22, a sending/receiving unit 23, a data division unit 24, an interference time storage unit 25, a waiting time determination unit 26, and an antenna 27. Note that the antenna 27 in FIGS. 1 and 2 is contained in the wireless station 11 in practice.

The data division unit 24 divides the data acquired from the target device 10 into separate pieces of data such that each piece of data is sized to be containable in a data frame that is generated by the frame generation unit 21. The data division unit 24 outputs the divided data to the frame generation unit 21. In a case where the data acquired from the target device 10 is sized to be containable in a data frame, the data division unit 24 does not have to divide the data.

The frame generation unit 21 generates a data frame using the divided data provided by the data division unit 24 and outputs the data frame to the transmission control unit 22. The destination of the generated data frame is the data aggregation station 12 or the wireless station 11 that serves as a relay destination. The frame generation unit 21 may acquire multiple pieces of divided data from the data division unit 24, in which case the frame generation unit 21 generates a plurality of data frames for containing, that is, carrying, the divided data. In addition, the frame generation unit 21 may acquire, from the sending/receiving unit 23, a data frame to be relayed to another wireless station 11, in which case the frame generation unit 21 changes the destination of the data frame and outputs the data frame to the transmission control unit 22. A data frame, i.e., a relay target to be relayed from a wireless station 11 to another wireless station 11 is a data frame addressed to the former wireless station 11. Specifically, the frame generation unit 21 of the wireless station 11 changes the destination of the data frame from that wireless station 11 to the adjacent station in the direction to the data aggregation station 12, the adjacent station being either the data aggregation station 12 or the wireless station 11 that serves as a relay destination. In the following description, a data frame that is a relay target in the wireless station 11 may be referred to as a first data frame. A data frame that the frame generation unit 21 newly generates by changing the destination of the first data frame may be referred to as a second data frame. A data frame that the frame generation unit 21 generates using the data acquired from the data division unit 24 may be referred to as a third data frame. Data frames received at the sending/receiving unit 23 of the wireless station 11 include a first data frame that is a relay target addressed to that wireless station 11. The frame generation unit 21 generates a second data frame by changing the destination of the first data frame to the data aggregation station 12 or the wireless station 11 that serves as a relay destination.

The sending/receiving unit 23 sends, via the antenna 27, the data frames acquired from the transmission control unit 22. The sending/receiving unit 23 also outputs the data frames received via the antenna 27 to the interference time storage unit 25. At this time, the sending/receiving unit 23 of the wireless station 11 receives data frames unrelated to that wireless station 11 as well as the data frames to be relayed to another wireless station 11. A data frame unrelated to the wireless station 11 is a data frame addressed to another wireless station 11. That is, the sending/receiving unit 23 receives any receivable data frames sent from the other wireless stations 11, regardless of the destinations. The sending/receiving unit 23 outputs the data frames to be relayed to another wireless station 11, to the frame generation unit 21 as well as to the interference time storage unit 25.

The interference time storage unit 25 stores, as an interference time, the reception time of each data frame acquired from the sending/receiving unit 23. The reception time of a data frame is the time from when the sending/receiving unit 23 starts receiving the date frame to when the sending/receiving unit 23 terminates receiving the data frame. The interference time storage unit 25 outputs the interference time information to the waiting time determination unit 26.

The waiting time determination unit 26 determines a waiting time on the basis of the interference time acquired from the interference time storage unit 25. The waiting time is the time for which the wireless station 11 waits in relaying the data frame to another wireless station 11. The waiting time determination unit 26 outputs the waiting time information to the transmission control unit 22.

The transmission control unit 22 waits on the basis of the waiting time specified by the waiting time determination unit 26, and thereafter outputs, to the sending/receiving unit 23, the data frame acquired from the frame generation unit 21 to be relayed to another wireless station 11. That is, the transmission control unit 22 waits for the waiting time, and causes the sending/receiving unit 23 to send the second data frame. The transmission control unit 22 outputs, to the sending/receiving unit 23 without waiting, any data frame acquired from the frame generation unit 21 other than the data frames to be relayed to another wireless station 11. A data frame other than the data frames to be relayed to another wireless station 11 is a data frame which the frame generation unit 21 has generated using the divided data acquired from the data division unit 24. That is, the transmission control unit 22 causes the sending/receiving unit 23 to send the third data frame without waiting for the waiting time.

Figure 3:
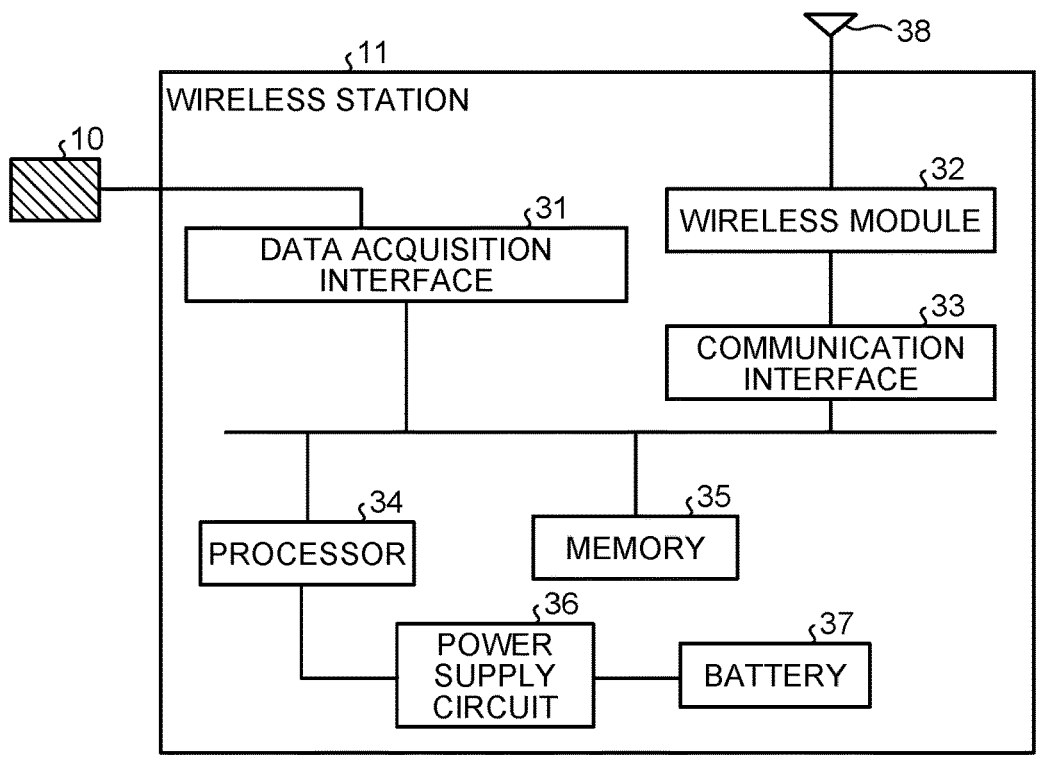
FIG. 3 is a diagram illustrating an exemplary hardware configuration of the wireless station according to the first embodiment.

FIG. 3 is a diagram illustrating an exemplary hardware configuration of the wireless station 11 according to the first embodiment. The wireless station 11 includes a data acquisition interface 31, a wireless module 32, a communication interface 33, a processor 34, a memory 35, a power supply circuit 36, a battery 37, and an antenna element 38.

The data acquisition interface 31 converts the data acquired from the target device 10 into a data format that can be read by the processor 34, and outputs the data to the processor 34. The wireless module 32 converts the data frame received by the antenna element 38 into a format that can be read by the communication interface 33, and outputs the data frame to the communication interface 33. The wireless module 32 also converts the data frame acquired from the communication interface 33 into a format that can be sent from the antenna element 38, and sends the data frame through the antenna element 38. The communication interface 33 converts the data frame acquired from the wireless module 32 into a format that can be read by the processor 34, and outputs the data frame to the processor 34. The communication interface 33 also converts the data frame acquired from the processor 34 into a format that can be read by the wireless module 32, and outputs the data frame to the wireless module 32.

The processor 34 performs processing such as data frame generation and waiting time determination. The processor 34 may be a central processing unit (CPU), a processing device, an arithmetic device, a microprocessor, a microcomputer, a digital signal processor (DSP), or the like. The same applies to other processors described later. The memory 35 temporarily stores information necessary for processing by the processor 34. Examples of the memory 35 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like. The same applies to other memories described later.

The power supply circuit 36 and the battery 37 supply power to the data acquisition interface 31, the wireless module 32, the communication interface 33, the processor 34, the memory 35, and the antenna element 38.

Figure 4:
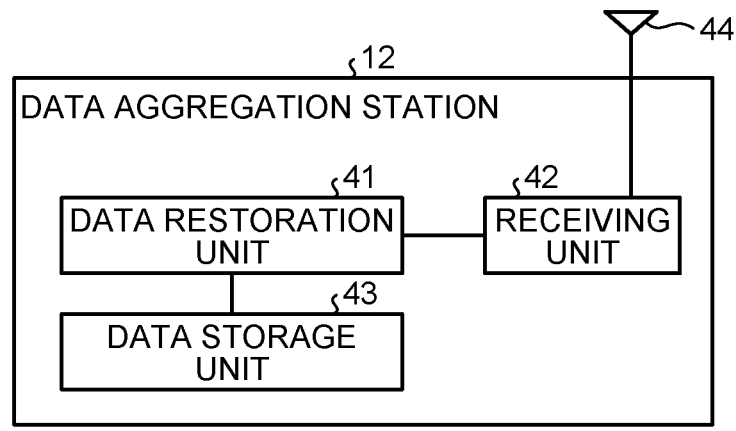
FIG. 4 is a block diagram illustrating an exemplary configuration of a data aggregation station according to the first embodiment.

Next, the configuration of the data aggregation station 12 will be described. FIG. 4 is a block diagram illustrating an exemplary configuration of the data aggregation station 12 according to the first embodiment. The data aggregation station 12 includes a data restoration unit 41, a receiving unit 42, a data storage unit 43, and an antenna 44. The receiving unit 42 receives data frames from the wireless station 11 via the antenna 44. The data frames include the second and third data frames described above. The receiving unit 42 outputs the received data frames to the data restoration unit 41. Note that the receiving unit 42 may be a sending/receiving unit capable of sending a control frame to the data aggregation station 12 or the wireless station 11. The data restoration unit 41 restores data from the data frames acquired from the receiving unit 42, and outputs the data to the data storage unit 43. Specifically, using the data divided by the data division unit 24 of the wireless station 11 and separately contained in the plurality of data frames, the data restoration unit 41 makes the pre-division data. The data storage unit 43 stores, in an area for data storage, the data restored by the data restoration unit 41 and acquired from the data restoration unit 41.

Figure 5:
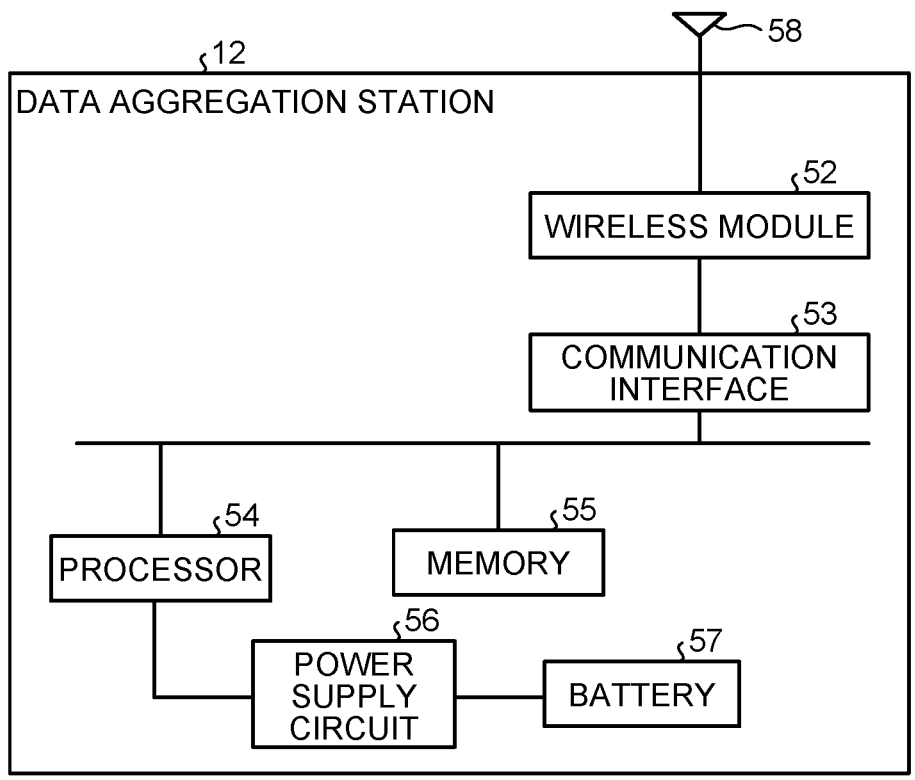
FIG. 5 is a diagram illustrating an exemplary hardware configuration of the data aggregation station according to the first embodiment.

FIG. 5 is a diagram illustrating an exemplary hardware configuration of the data aggregation station 12 according to the first embodiment. The data aggregation station 12 includes a wireless module 52, a communication interface 53, a processor 54, a memory 55, a power supply circuit 56, a battery 57, and an antenna element 58. The wireless module 52 converts the data frame received by the antenna element 58 into a format that can be read by the communication interface 53, and outputs the data frame to the communication interface 53. The communication interface 53 converts the data frame acquired from the wireless module 52 into a format that can be read by the processor 54, and outputs the data frame to the processor 54. The processor 54 and the memory 55 restore and record data from the data frame acquired from the communication interface 53. The power supply circuit 56 and the battery 57 supply power to the wireless module 52, the communication interface 53, the processor 54, the memory 55, and the antenna element 58.

Figure 6:
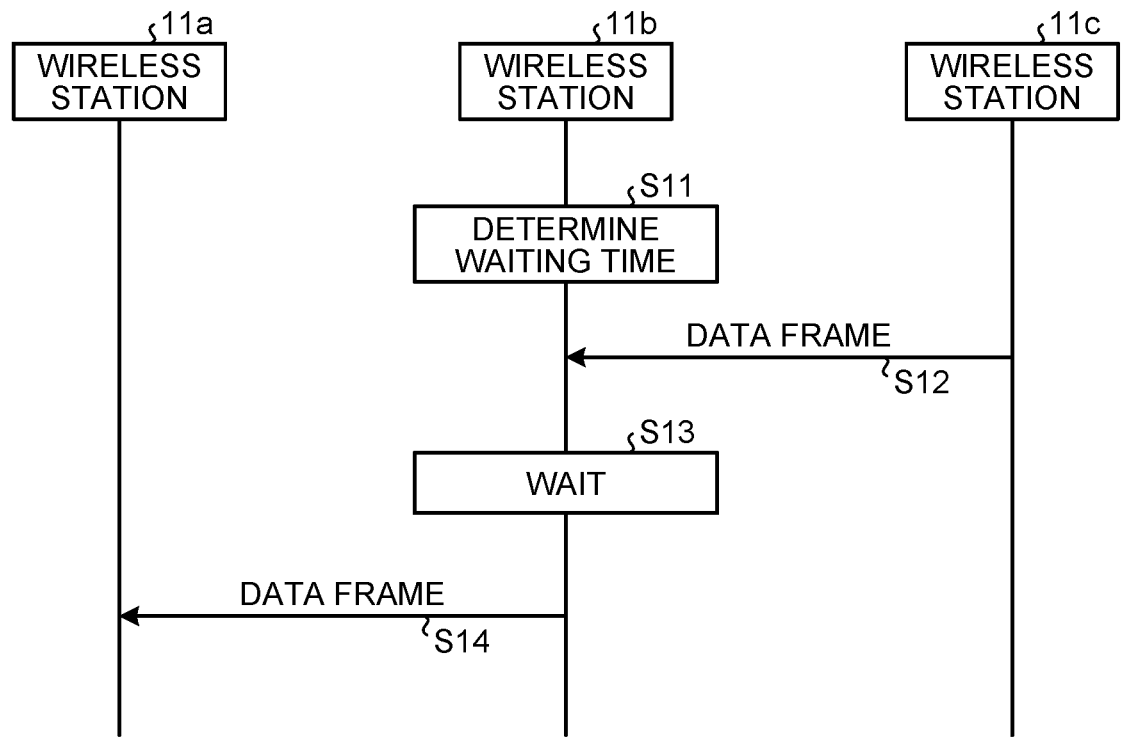
FIG. 6 is a sequence diagram illustrating how the wireless station autonomously avoids interference when relaying a data frame according to the first embodiment.

Next, the operation of the wireless station 11 will be described. FIG. 6 is a sequence diagram illustrating how the wireless station 11 autonomously avoids interference when relaying a data frame according to the first embodiment. In the exemplary case described below, the wireless station 11b receives a data frame from the wireless station 11c and relays the data frame to the wireless station 11a. The wireless station 11b stores, as an interference time, the time during which the data frame is being received, and determines a waiting time (step S11). At this time, the wireless station 11b receives not only the data frame to be relayed to another wireless station 11 but also data frames unrelated to the wireless station 11b, and stores interference times. How the wireless station 11b determines a waiting time will be described in detail later. In response to receiving the data frame from the wireless station 11c (step S12), the wireless station 11b changes the destination of the data frame from the wireless station 11b to the wireless station 11a, and waits for the waiting time (step S13). After waiting for the waiting time, the wireless station 11b sends, or relays, the data frame to the wireless station 11a (step S14). Although FIG. 6 depicts the operation of the wireless station 11b as an example, all the wireless stations 11 of the wireless system 15 perform the same operation as the wireless station 11b.

Figure 7:
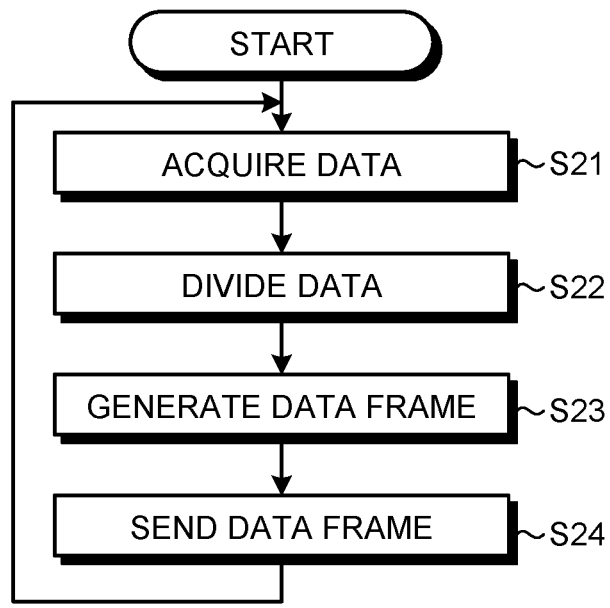
FIG. 7 is a flowchart illustrating how the wireless station generates and sends a data frame according to the first embodiment.
Figure 8:
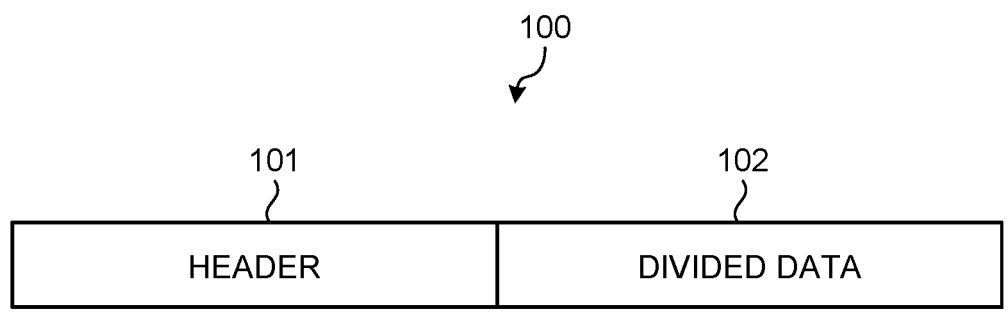
FIG. 8 is a diagram illustrating an exemplary configuration of a data frame that is generated by the frame generation unit of the wireless station according to the first embodiment.

Detailed procedures for the operation of the wireless station 11 will be described. FIG. 7 is a flowchart illustrating how the wireless station 11 generates and sends a data frame according to the first embodiment. In the wireless station 11, the data division unit 24 acquires data from the corresponding target device 10 (step S21). The data division unit 24 divides the acquired data (step S22), and outputs the divided data to the frame generation unit 21. The frame generation unit 21 generates a data frame, using the data acquired from the data division unit 24 (step S23). FIG. 8 is a diagram illustrating an exemplary configuration of a data frame 100 that is generated by the frame generation unit 21 of the wireless station 11 according to the first embodiment. The data frame 100 is composed of a header 101 and divided data 102. The header 101 includes information such as the destination of the data frame 100. In the example of FIG. 6, the destination of the data frame 100 generated by the wireless station 11b is the wireless station 11a. Note that the configuration of the data frame 100 illustrated in FIG. 8 is an example, and the data frame 100 may include information other than the header 101 and the divided data 102. The frame generation unit 21 outputs the generated data frame to the transmission control unit 22. The transmission control unit 22 outputs the acquired data frame to the sending/receiving unit 23 without waiting for the waiting time. The sending/receiving unit 23 sends the data frame via the antenna 27 (step S24).

Figure 9:
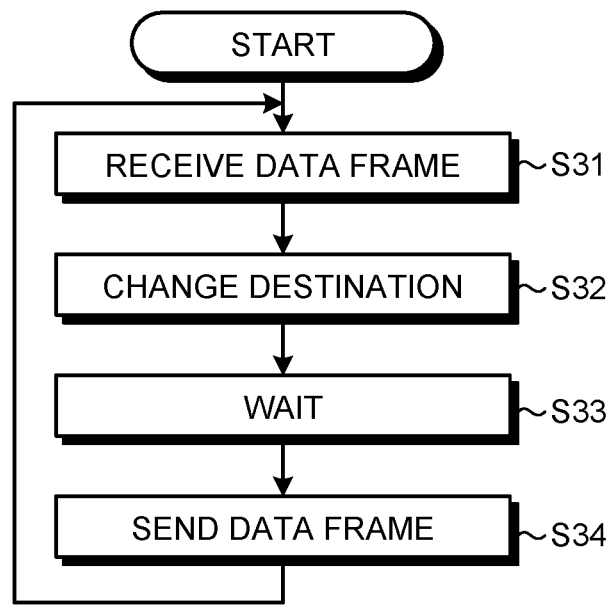
FIG. 9 is a flowchart illustrating how the wireless station relays a data frame according to the first embodiment.

FIG. 9 is a flowchart illustrating how the wireless station 11 relays a data frame according to the first embodiment. In the wireless station 11, the sending/receiving unit 23 receives a data frame that is a relay target via the antenna 27 (step S31), and then outputs the data frame to the frame generation unit 21 as well as to the interference time storage unit 25. The frame generation unit 21 changes the destination of the data frame to the next relay destination (step S32). In the example of FIG. 6, the frame generation unit 21 changes the destination of the data frame from the wireless station 11b to the wireless station 11a. The frame generation unit 21 generates the data frame having the destination changed, and outputs the generated data frame to the transmission control unit 22. The transmission control unit 22 waits for the waiting time specified by the waiting time determination unit 26 (step S33), and outputs the data frame acquired from the frame generation unit 21 to the sending/receiving unit 23. The sending/receiving unit 23 sends the data frame to the next relay via the antenna 27 (step S34).

Figure 10:
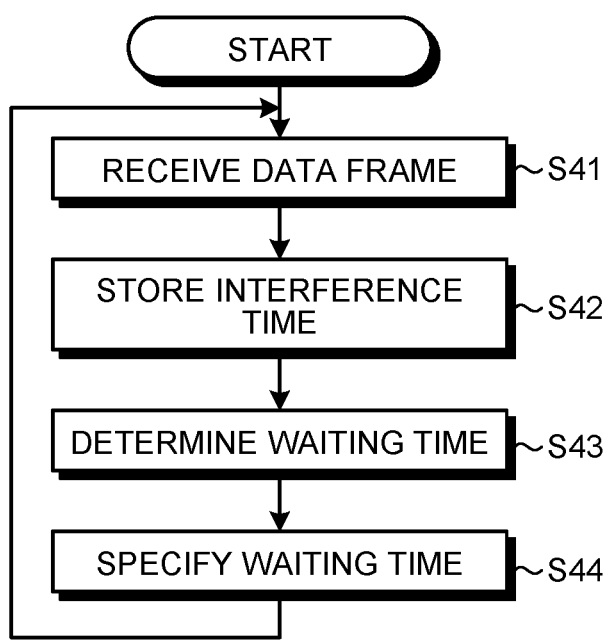
FIG. 10 is a flowchart illustrating how the wireless station determines a waiting time according to the first embodiment.

FIG. 10 is a flowchart illustrating how the wireless station 11 determines a waiting time according to the first embodiment. The sending/receiving unit 23 of the wireless station 11 receives, via the antenna 27, data frames unrelated to that wireless station 11 as well as the data frame to be relayed to another wireless station 11 (step S41). The sending/receiving unit 23 outputs the received data frames to the interference time storage unit 25. The interference time storage unit 25 stores, as an interference time, the time from when the sending/receiving unit 23 start receiving the data frame to when the sending/receiving unit 23 terminates receiving the data frame (step S42). The interference time storage unit 25 outputs the interference time information to the waiting time determination unit 26. The waiting time determination unit 26 determines a waiting time on the basis of the interference time (step S43). The waiting time determination unit 26 notifies the transmission control unit 22 of the determined waiting time (step S44).

Figure 11:
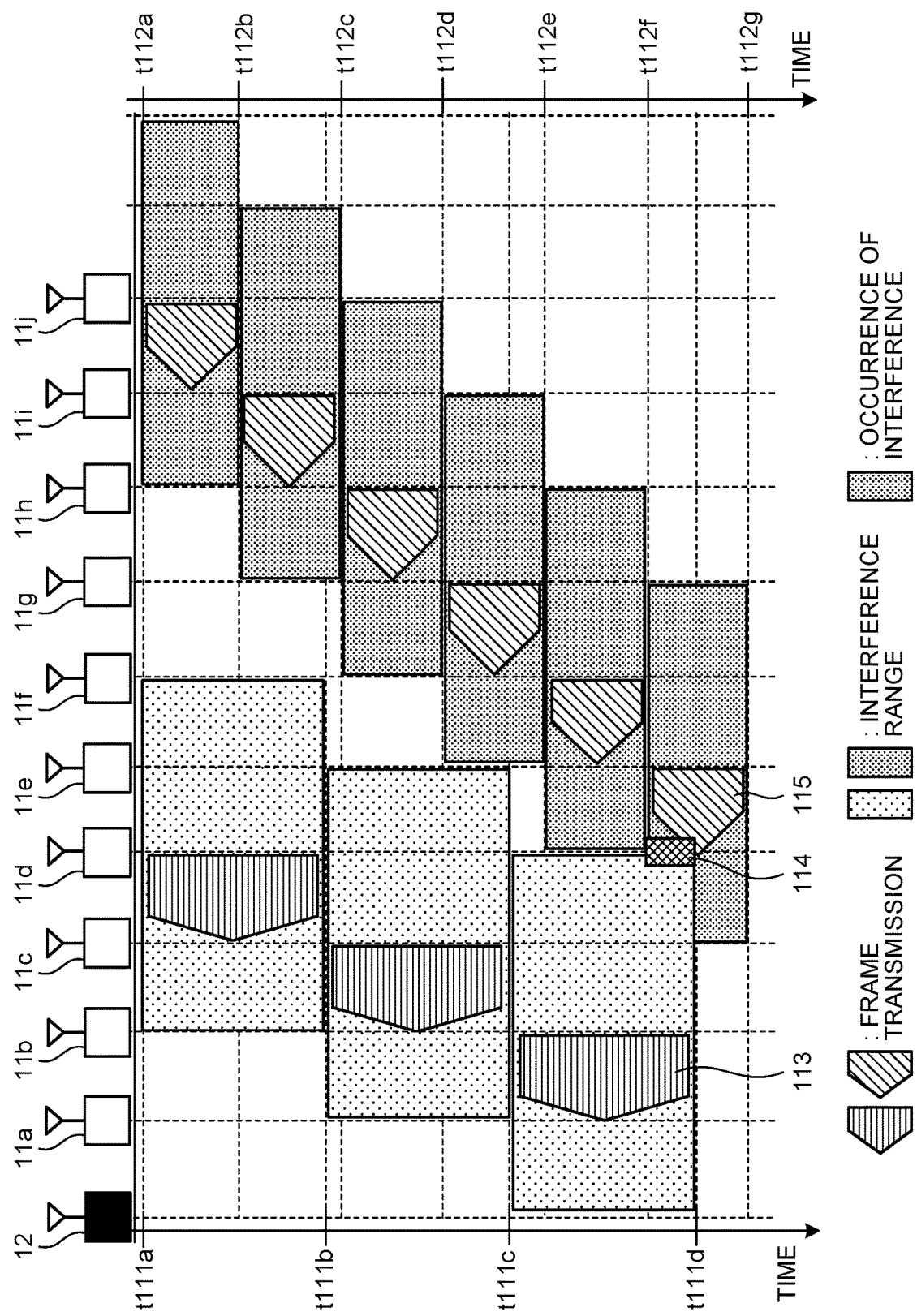
FIG. 11 is a diagram illustrating an example of interference that occurs when the wireless station relays a data frame without waiting according to the first embodiment.

A description will be made as to transmission and reception of data frames at each wireless station 11 in the wireless system 15 as the waiting time determination unit 26 determines a waiting time. FIG. 11 is a diagram illustrating an example of interference that occurs when the wireless station 11e relays a data frame without waiting according to the first embodiment. FIG. 11 depicts a situation that requires setting a waiting time so as to avoid interference. FIG. 11 shows that the wireless station 11d and the wireless station 11j send data frames simultaneously. FIG. 11 also indicates that the wireless station 11d ahead and the wireless station 11j behind send a data frame 113 and a data frame 115, respectively, in a direction of relay of data frames, and the data frame 115 has a shorter data length or a smaller amount of data than the data frame 113. In such a case, in the wireless system 15, the transmission of the data frame 115 sent from the rear wireless station 11j catches up with the transmission of the data frame 113 sent from the front wireless station 11d during the relay of the data frames. As a result, the wireless station 11d enters the interference range of the transmission of the front data frame 113, and thus the transmission of the rear data frame 115 fails in an area 114.

Figure 12:
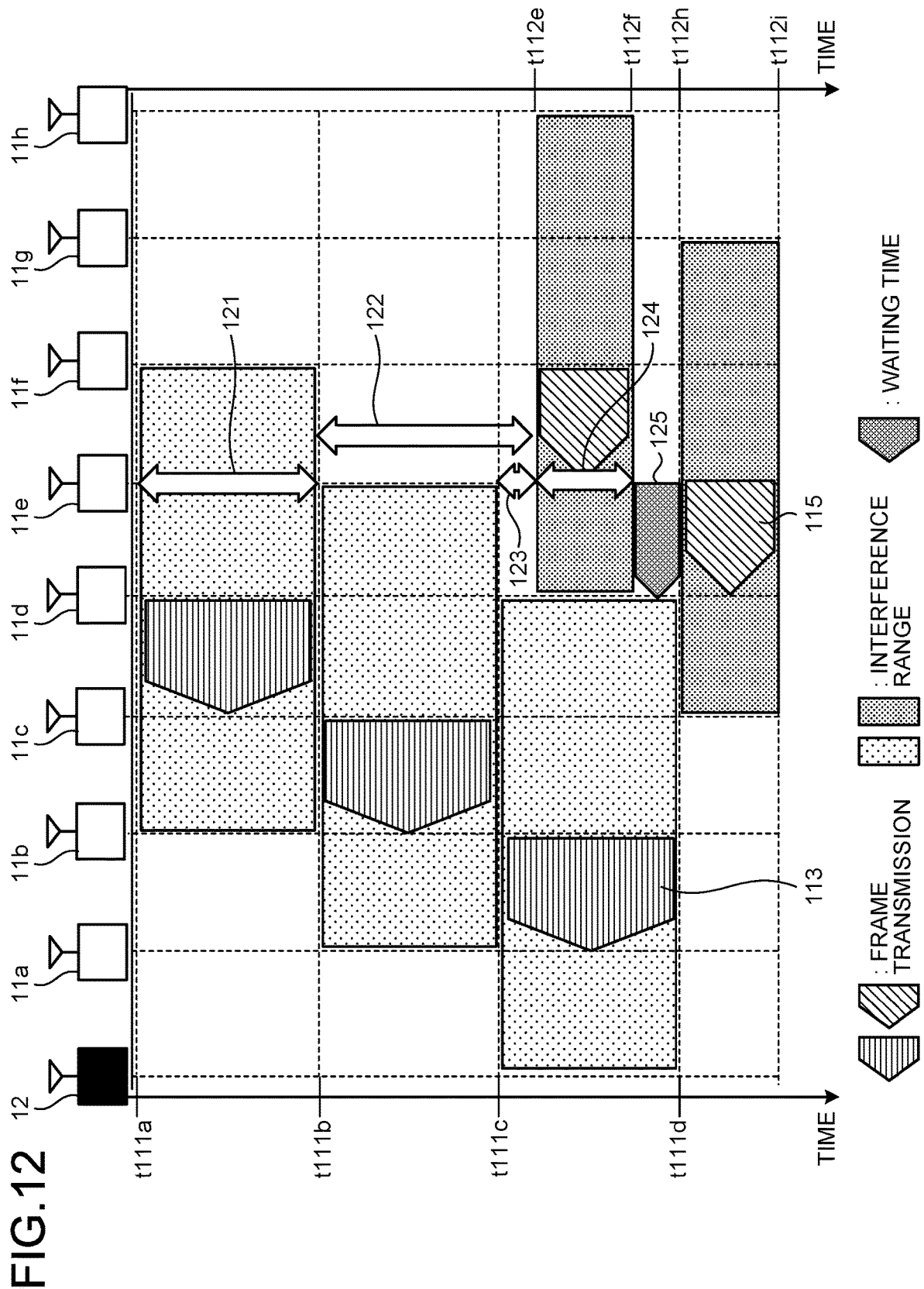
FIG. 12 is a diagram illustrating an example of how the wireless station avoids interference by waiting to relay a data frame according to the first embodiment.

A method of avoiding interference during the relay of the data frames in the situation illustrated in FIG. 11 will be described with reference to FIG. 12. FIG. 12 is a diagram illustrating an example in which the wireless station 11e avoids interference by waiting before relaying a data frame according to the first embodiment. In the wireless station 11e, the sending/receiving unit 23 receives the data frame 113 sent from the wireless station 11d to the wireless station 11c ahead in the data frame relay direction to the data aggregation station 12. The interference time storage unit 25 stores the time from the time point t111a to the time point t111b as a time 121 of interference from ahead. In the wireless station 11e, the sending/receiving unit 23 also receives the data frame 115 sent from the wireless station 11f to the wireless station 11e. The interference time storage unit 25 stores the time from the time point t112e to the time point t112f as a time 124 of interference from behind. The interference time storage unit 25 calculates a time interval 122 from the time point t111b to the time point t112e. In the wireless station 11e, the waiting time determination unit 26 assumes that the interference time from the time point t111b to the time point t111c is equal to the time 121 of interference from ahead, and the waiting time determination unit 26 calculates a time interval 123 by subtracting the interference time 121 from the time interval 122. The waiting time determination unit 26 assumes that the interference time from the time point t111c to the time point t111d is equal to the time 121 of interference from ahead, and obtains a waiting time 125 by subtracting the time interval 123 and the time 124 of interference from behind, from the time 121 of interference from ahead.

The time from the time point t112f to the time point t112g in FIG. 11, during which the wireless station 11e relays the data frame 115 to the wireless station 11d, is changed to the time from the time point t112h to the time point t112i in FIG. 12, during which the wireless station 11e relays the data frame 115 to the wireless station 11d. As a result, the wireless system 15 can avoid the transmission failure in the area 114 illustrated in FIG. 11. In this way, each wireless station 11 determines a waiting time on the basis of the interference time, so that each wireless station 11 in the wireless system 15 can autonomously avoid interference in correspondence to the communication state.

Figure 13:
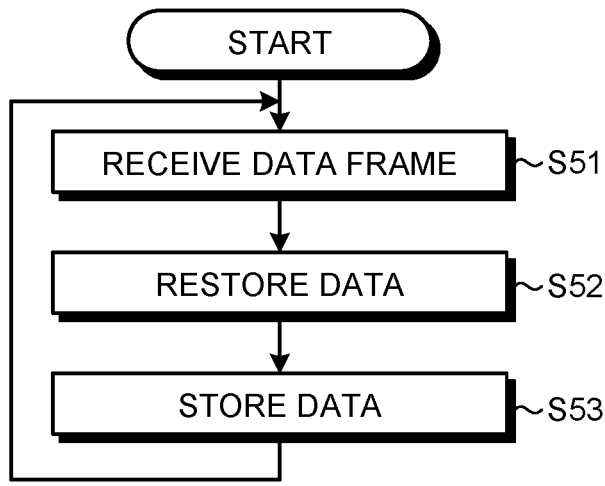
FIG. 13 is a flowchart illustrating how the data aggregation station receives a data frame according to the first embodiment.

A description will be made as to operations of the data aggregation station 12 when the data aggregation station 12 receives data frames. FIG. 13 is a flowchart illustrating how the data aggregation station 12 receives a data frame according to the first embodiment. In the data aggregation station 12, the receiving unit 42 receives a data frame from the wireless station 11a via the antenna 44 (step S51). Using the data frame received at the receiving unit 42, the data restoration unit 41 makes the pre-division data that was data before the division by the wireless station 11 (step S52). The data restoration unit 41 outputs the pre-division data, or the restored data to the data storage unit 43. The data storage unit 43 stores the acquired data (step S53).

As described above, according to the present embodiment, the wireless stations 11, which are arranged to provide a linear route in the wireless system 15, record the time of the reception of a data frame as an interference time, and determine, on the basis of the interference time, the waiting time preceding the relay of the data frame. This enables the wireless stations 11 to autonomously avoid interference between the wireless stations 11 during frame relay in correspondence to the communication state without being controlled by, for example, the data aggregation station 12. As a result, the wireless system 15 can reduce the loss rate of data frames sent by each wireless station 11.

Second Embodiment

In the first embodiment, the wireless station 11 waits for a waiting time before sending the data frame to be relayed. In the second embodiment, the wireless station 11 further waits until the radio field intensity of ambient interference falls below a threshold. Differences from the first embodiment will be described.

The configurations of the wireless system 15, the wireless station 11, and the data aggregation station 12 according to the second embodiment are the same as those in the first embodiment illustrated in FIGS. 1 to 5. In the second embodiment, data frame relaying operation in the wireless station 11 is different from that in the first embodiment.

Figure 14:
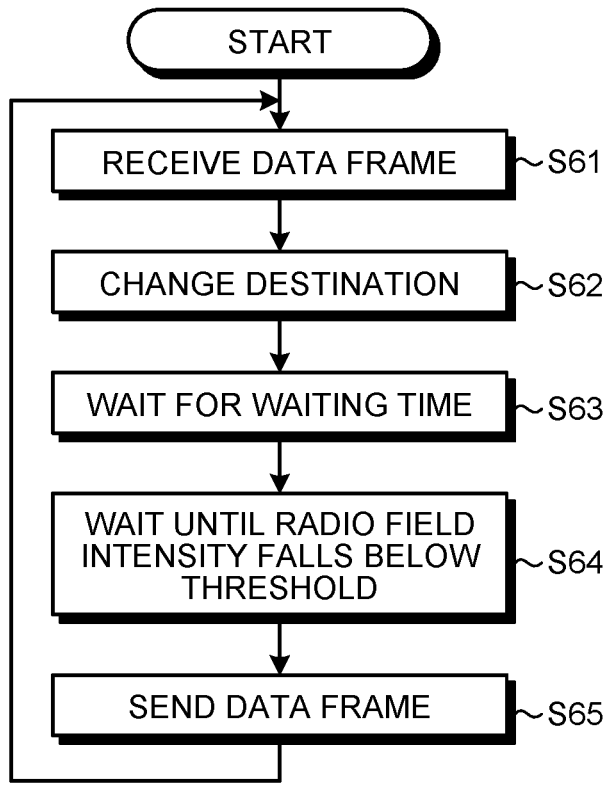
FIG. 14 is a flowchart illustrating how the wireless station relays a data frame according to a second embodiment.

FIG. 14 is a flowchart illustrating how the wireless station 11 relays a data frame according to the second embodiment. In the wireless station 11, the sending/receiving unit 23 receives a data frame that is a relay target via the antenna 27 (step S61), and then outputs the data frame to the frame generation unit 21 as well as to the interference time storage unit 25. The frame generation unit 21 changes the destination of the data frame to the next relay destination (step S62). The frame generation unit 21 generates the data frame having the destination changed, and outputs the generated data frame to the transmission control unit 22. The transmission control unit 22 waits for the waiting time specified by the waiting time determination unit 26 (step 363). The sending/receiving unit 23 of the wireless station 11 then measures the radio field intensity of interference around that wireless station 11, that is to say, the radio field intensity of the data frame sent from another wireless station 11. The sending/receiving unit 23 outputs information on the measured radio field intensity to the transmission control unit 22. On the basis of the information on the measured radio field intensity acquired from the sending/receiving unit 23, the transmission control unit 22 further waits until the radio field intensity falls below the threshold when the radio field intensity is higher than or equal to a prescribed threshold (step S64). Once the radio field intensity falls below the prescribed threshold, the transmission control unit 22 outputs the data frame acquired from the frame generation unit 21 to the sending/receiving unit 23. The sending/receiving unit 23 sends the data frame to the next relay destination via the antenna 27 (step S65).

As described above, according to the present embodiment, the wireless station 11 checks the radio field intensity of interference after waiting for the waiting time, and further waits until the radio field intensity of interference falls below the threshold. As a result, the wireless station 11 achieves high accuracy of interference avoidance as compared to the first embodiment.

Third Embodiment

In the first and second embodiments, the wireless station 11 autonomously determines a waiting time to avoid interference. In the third embodiment, for further enhancement of the effect of interference avoidance due to the waiting time, the data aggregation station controls an amount of data frames to be generated by each wireless station 11. Differences from the first and second embodiments will be described.

In the third embodiment, the configuration of the wireless station 11 is the same as that in the first embodiment illustrated in FIGS. 2 and 3. In the third embodiment, the wireless system 15 includes a data aggregation station 12A (described later) in place of the data aggregation station 12 of the wireless system 15 according to the first embodiment illustrated in FIG. 1.

Figure 15:
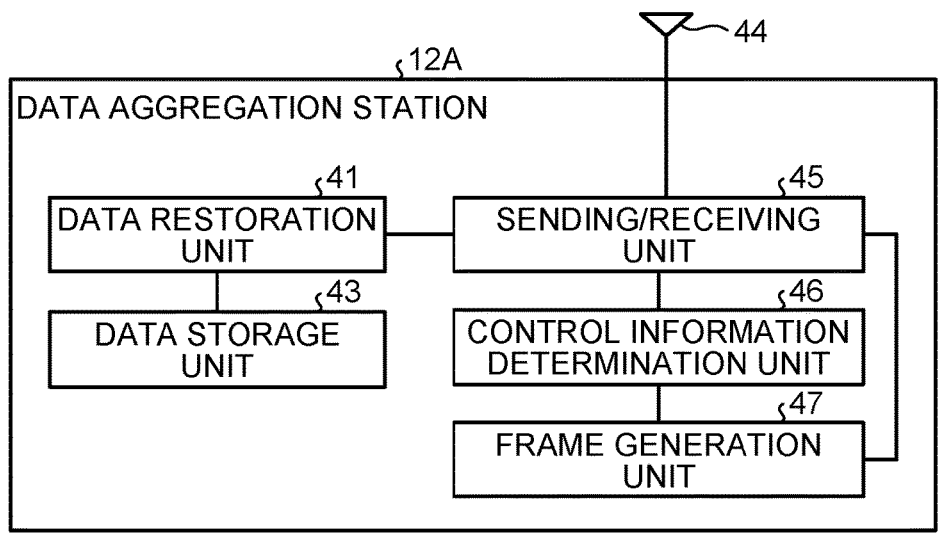
FIG. 15 is a block diagram illustrating an exemplary configuration of a data aggregation station according to a third embodiment.

FIG. 15 is a block diagram illustrating an exemplary configuration of the data aggregation station 12A according to the third embodiment. The data aggregation station 12A includes the data restoration unit 41, the data storage unit 43, the antenna 44, a sending/receiving unit 45, a control information determination unit 46, and a frame generation unit 47.

The sending/receiving unit 45 receives a data frame via the antenna 44 and outputs the data frame to the data restoration unit 41. The sending/receiving unit 45 also receives a first control frame via the antenna 44 and outputs the first control frame to the control information determination unit 46. The first control frame is a control frame including information on measured radio field intensity indicating the state of ambient interference measured by the wireless station 11. The sending/receiving unit 45 sends a second control frame generated by the frame generation unit 47 to the wireless station 11 via the antenna 44.

The control information determination unit 46 grasps the information on the radio field intensity measured by the wireless station 11 from the acquired first control frame. Using information on the measured radio field intensity and information on the data frames previously received from each wireless station 11, the control information determination unit 46 determines, for each wireless station 11, generation frame amount specification information indicating a generable data frame amount. Examples of information on the data frames previously received from each wireless station 11 include, but are not limited to, the number of received data frames, the content of the information indicated by the data contained in the data frames, and the priority of the information indicated by the data contained in the data frames. The generable data frame amount is the maximum number of data frames that can be generated by each wireless station 11. The control information determination unit 46 outputs the generation frame amount specification information to the frame generation unit 47.

The frame generation unit 47 generates a second control frame including the generation frame amount specification information acquired from the control information determination unit 46, and outputs the second control frame to the sending/receiving unit 45.

Figure 16:
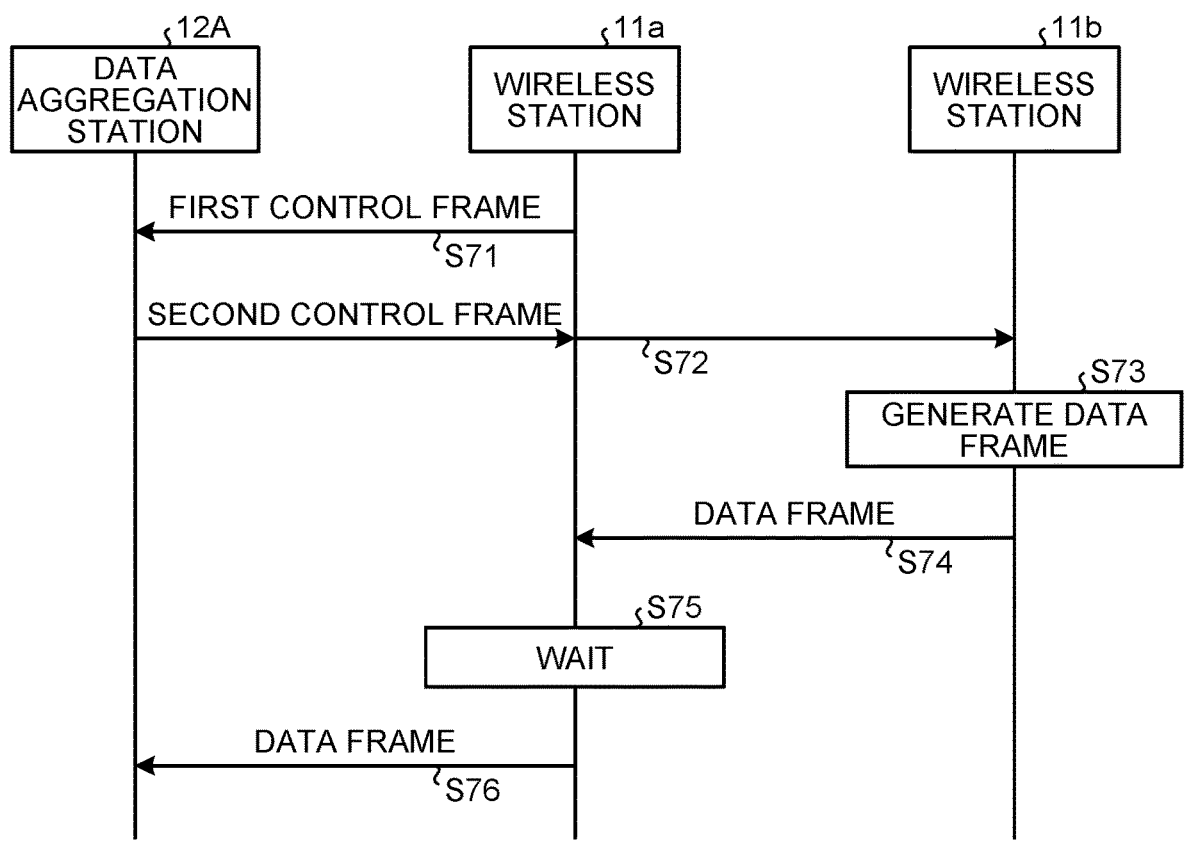
FIG. 16 is a sequence diagram illustrating how the wireless station generates and sends a data frame based on the generation frame amount specification information determined by the data aggregation station according to the third embodiment.

FIG. 16 is a sequence diagram illustrating how the wireless station 11 generates and sends a data frame on the basis of the generation frame amount specification information determined by the data aggregation station 12A according to the third embodiment. FIG. 16 depicts an operation example in which the wireless station 11b sends a data frame and the wireless station 11a relays the data frame. The wireless station 11a measures the radio field intensity indicating the state of ambient interference, regularly generates first control frames including information on the measured radio field intensity, and sends each first control frame to the data aggregation station 12A (step S71). In response to receiving the first control frame (step S71), the data aggregation station 12A grasps the information on the measured radio field intensity from the first control frame. The data aggregation station 12A determines generation frame amount specification information for each wireless station 11, using the information on the measured radio field intensity and information on the data frames previously received from each wireless station 11. The data aggregation station 12A generates a second control frame including the generation frame amount specification information, and sends the second control frame to the wireless station 11b via the wireless station 11a (step S72). The wireless station 11b receives the second control frame (step S72). The wireless station 11b generates a data frame on the basis of the generation frame amount specification information indicated by the second control frame (step S73), and sends the data frame to the wireless station 11a (step S74). Subsequent steps S75 and S76 are the same as steps S13 and S14 that the wireless station 11b performs in the sequence diagram illustrated in FIG. 6.

Although FIG. 16 depicts the operation of part of the wireless stations 11, all the wireless stations 11 in the wireless system 15 regularly send first control frames in the same manner as the wireless station 11a. In addition, the data aggregation station 12A generates and sends second control frames in response to all the first control frames.

Figure 17:
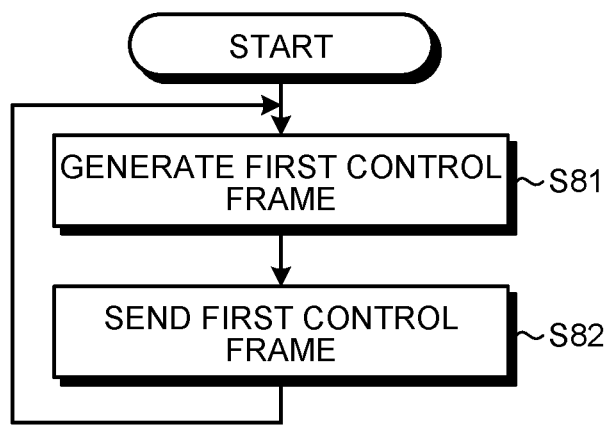
FIG. 17 is a flowchart illustrating how the wireless station generates and sends a first control frame according to the third embodiment.
Figure 18:
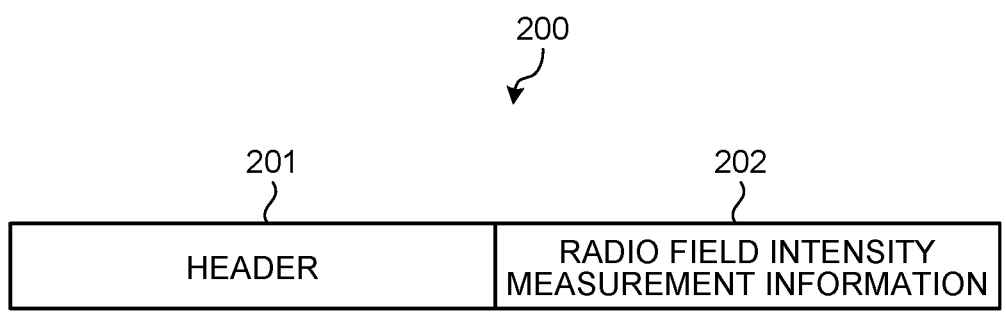
FIG. 18 is a diagram illustrating an exemplary configuration of a first control frame that is generated by the frame generation unit of the wireless station according to the third embodiment.

Detailed procedures for the operation of the wireless station 11 and the data aggregation station 12A will be described. FIG. 17 is a flowchart illustrating how the wireless station 11 generates and sends a first control frame according to the third embodiment. In the wireless station 11, the sending/receiving unit 23 measures the radio field intensity of interference around that wireless station 11, that is to say, the radio field intensity of the data frame sent from another wireless station 11. The sending/receiving unit 23 outputs the information on the measured radio field intensity to the frame generation unit 21. The frame generation unit 21 regularly generates first control frames including the information on the measured radio field intensity (step S81). FIG. 18 is a diagram illustrating an exemplary configuration of a first control frame 200 that is generated by the frame generation unit 21 of the wireless station 11 according to the third embodiment. The first control frame 200 is composed of a header 201 and radio field intensity measurement information 202. The header 201 includes information such as the destination of the first control frame 200. Note that the configuration of the first control frame 200 illustrated in FIG. 18 is an example, and the first control frame 200 may include information other than the header 201 and the radio field intensity measurement information 202. The frame generation unit 21 outputs the first control frame to the transmission control unit 22. The transmission control unit 22 outputs the first control frame to the sending/receiving unit 23 without waiting for the waiting time. That is, the transmission control unit 22 causes the sending/receiving unit 23 to send the first control frame without waiting for the waiting time. The sending/receiving unit 23 sends the first control frame to the data aggregation station 12A via the antenna 27 (step S82).

Figure 19:
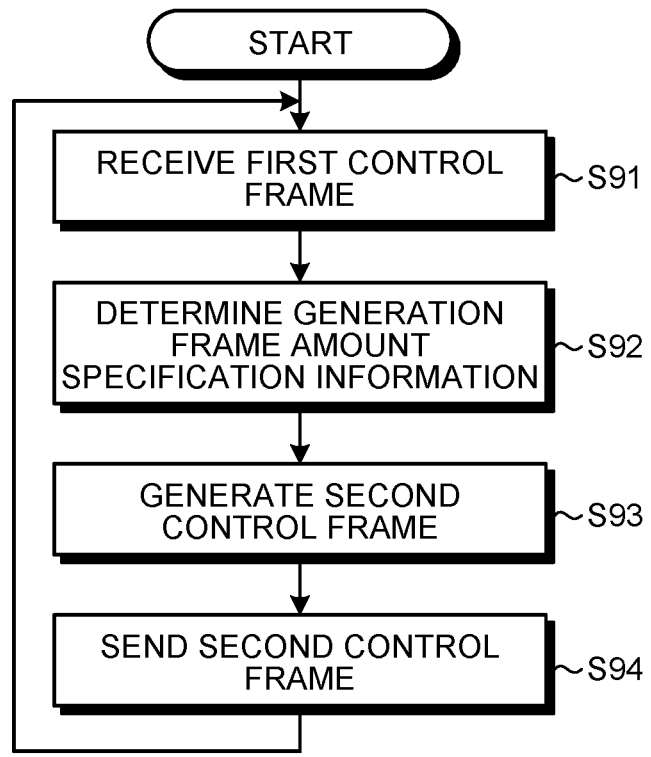
FIG. 19 is a flowchart illustrating how the data aggregation station generates and sends a second control frame according to the third embodiment.
Figure 20:
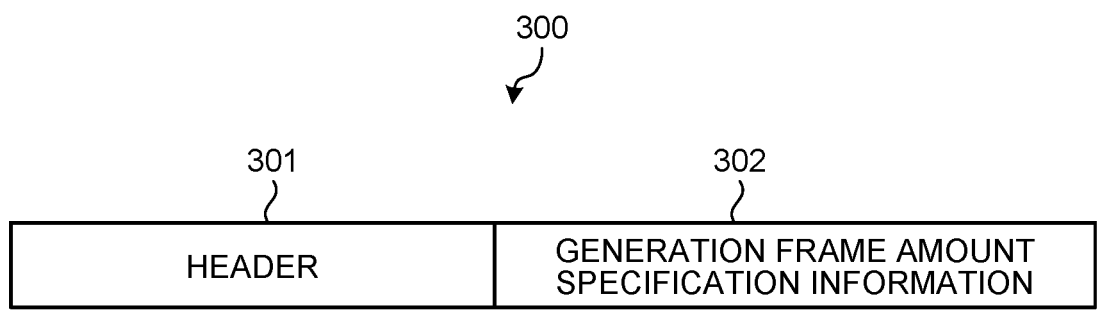
FIG. 20 is a diagram illustrating an exemplary configuration of a second control frame that is generated by the frame generation unit of the data aggregation station according to the third embodiment.

FIG. 19 is a flowchart illustrating how the data aggregation station 12A generates and sends a second control frame according to the third embodiment. In the data aggregation station 12A, the sending/receiving unit 45 receives a first control frame via the antenna 44 (step 391), and then outputs the first control frame to the control information determination unit 46. The control information determination unit 46 grasps information on measured radio field intensity from the first control frame. The control information determination unit 46 determines generation frame amount specification information for each wireless station 11, using the information on the measured radio field intensity and information on the data frames previously received from each wireless station 11 (step S92). The control information determination unit 46 outputs the determined generation frame amount specification information to the frame generation unit 47. The frame generation unit 47 generates a second control frame including the generation frame amount specification information acquired from the control information determination unit 46 (step S93). FIG. 20 is a diagram illustrating an exemplary configuration of a second control frame 300 that is generated by the frame generation unit 47 of the data aggregation station 12A according to the third embodiment. The second control frame 300 is composed of a header 301 and generation frame amount specification information 302. The header 301 includes information such as the destination of the second control frame 300. Note that the configuration of the second control frame 300 illustrated in FIG. 20 is an example, and the second control frame 300 may include information other than the header 301 and the generation frame amount specification information 302. The frame generation unit 47 outputs the second control frame to the sending/receiving unit 45. The sending/receiving unit 45 sends the second control frame to the wireless station 11 via the antenna 44 (step S94).

As described above, the control information determination unit 46 of the data aggregation station 12A determines the data frame amount generable in the wireless station 11, on the basis of the information on the radio field intensity of the data frame measured by the wireless station 11, the information on the measured radio field intensity being included in the first control frame received at the sending/receiving unit 45. The frame generation unit 47 generates a second control frame that specifies the data frame amount determined by the control information determination unit 46. The sending/receiving unit 45 sends the second control frame toward the wireless station 11.

Figure 21:
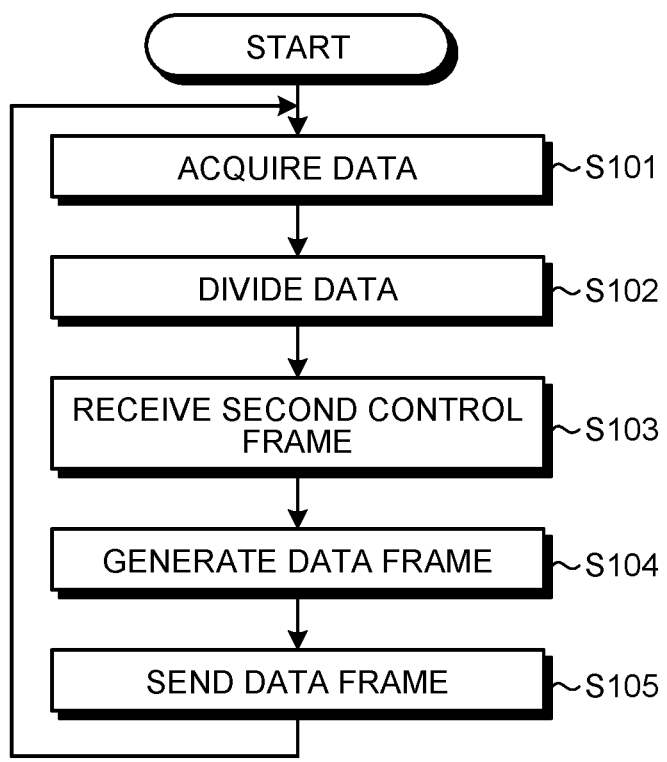
FIG. 21 is a flowchart illustrating how the wireless station generates and sends a data frame using a second control frame according to the third embodiment.

FIG. 21 is a flowchart illustrating how the wireless station 11 generates and sends a data frame, using a second control frame according to the third embodiment. In the wireless station 11, the data division unit 24 acquires data from the corresponding target device 10 (step S101). The data division unit 24 divides the acquired data (step S102), and outputs the divided data to the frame generation unit 21. The sending/receiving unit 23 receives a second control frame via the antenna 27 (step S103). The sending/receiving unit 23 outputs the second control frame to the frame generation unit 21. On the basis of the generation frame amount specification information included in the second control frame, the frame generation unit 21 generates a data frame in the specified data frame amount, using the data acquired from the data division unit 24 (step S104). The frame generation unit 21 outputs the generated data frame to the transmission control unit 22. The transmission control unit 22 outputs the acquired data frame to the sending/receiving unit 23 without waiting for the waiting time. The sending/receiving unit 23 sends the data frame via the antenna 27 (step S105).

As described above, in the wireless station 11, the sending/receiving unit 23 receives a second control frame from the data aggregation station 12A as a response to a first control frame sent by the wireless station 11 that is the destination of a third data frame, the second control frame specifying a generable data frame amount. On the basis of the data frame amount specified in the second control frame, the frame generation unit 21 determines the data frame amount in which to generate the third data frame.

As described above, according to the present embodiment, the data aggregation station 12A controls the data frame amount to be generated by each wireless station 11, using the information on the radio field intensity measured by each wireless station 11 and the data frame information provided by each wireless station 11. As a result, the wireless system 15 can further reduce the loss rate of data frames sent by each wireless station 11. In the third embodiment, it is possible to skip waiting in the waiting time.

Fourth Embodiment

The first to third embodiments are based on the premise that all the wireless stations 11 use the same frequency band. In the fourth embodiment, the wireless stations in the wireless system use a plurality of frequency bands. Differences from the first to third embodiments will be described.

Figure 22:
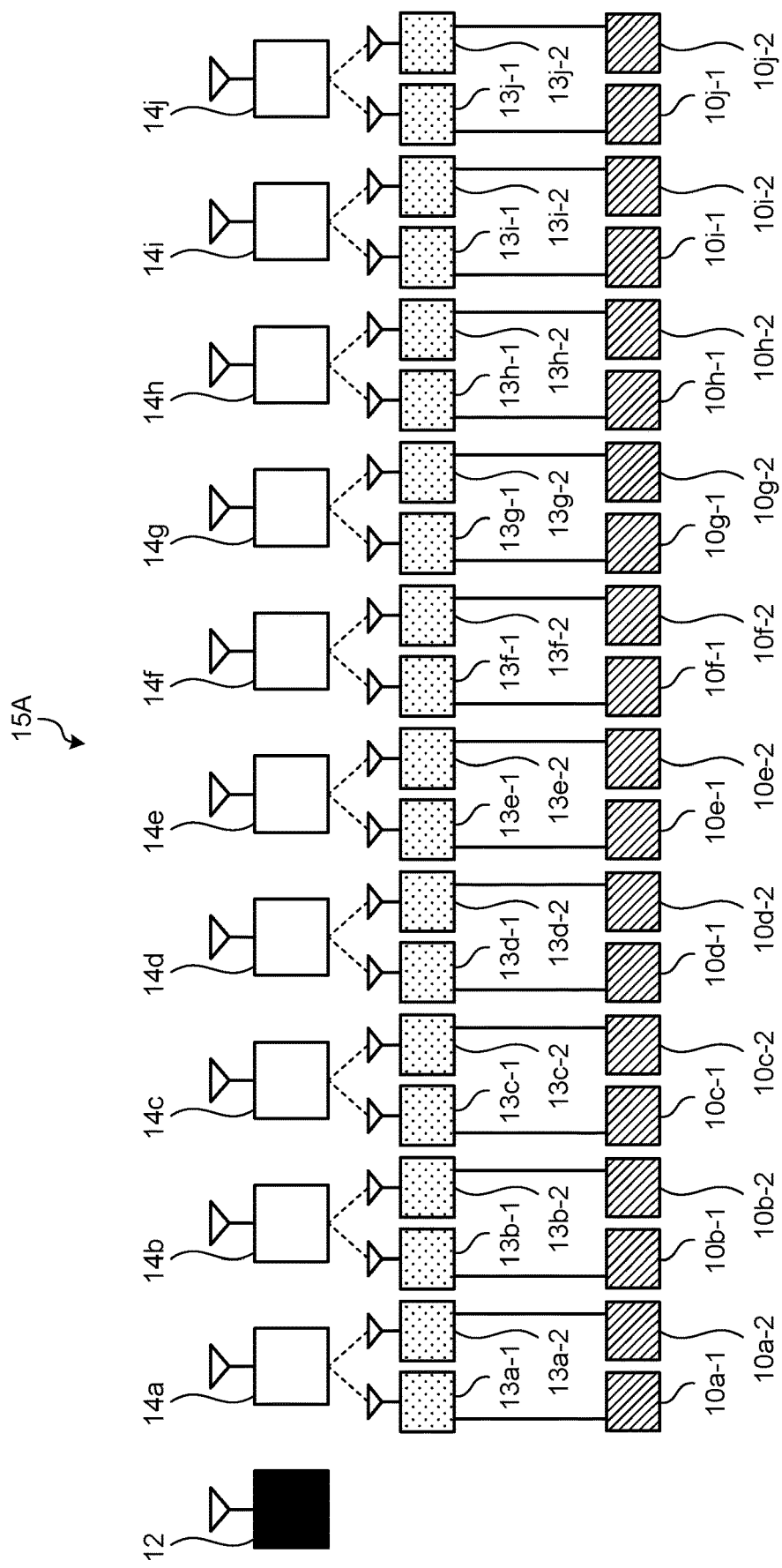
FIG. 22 is a diagram illustrating an exemplary configuration of a wireless system according to a fourth embodiment.

FIG. 22 is a diagram illustrating an exemplary configuration of a wireless system 15A according to the fourth embodiment. The wireless system 15A includes target devices 10a-1 to 10j-2, wireless stations 13a-1 to 13j-2, wireless stations 14a to 14j, and the data aggregation station 12.

The target devices 10a-1 to 10j-2 periodically generate data. The target devices 10a-1 to 10j-2 are each directly connected to the corresponding one of the wireless stations 13a-1 to 13j-2, and periodically send data to the corresponding one of the wireless stations 13a-1 to 13j-2. In the following description, the target devices 10a-1 to 10j-1 may be referred to as the target device(s) 10-1, and the target devices 10a-2 to 10j-2 may be collectively referred to as the target device(s) 10-2. The target devices 10-1 and 10-2 may be referred to as the target device(s) 10. The target devices 10-1 and 10-2 are similar to the target devices 10 according to the first embodiment.

The wireless stations 13a-1 to 13j-2 are wireless devices that each periodically acquire data from the corresponding one of the target devices 10a-1 to 10j-2. The wireless stations 13a-1 to 13j-2 each generate data frames using the acquired data, and send the data frames to the corresponding one of the wireless stations 14a to 14j in a first frequency band. In the following description, the wireless stations 13a-1 to 13j-1 may be referred to as the wireless station(s) 13-1, and the wireless stations 13a-2 to 13j-2 may be referred to as the wireless station(s) 13-2. The wireless stations 13-1 and 13-2 may be referred to as the wireless station(s) 13.

The wireless stations 14a to 14j are wireless devices that each acquire data frames in the first frequency band from the corresponding ones of the wireless stations 13a-1 to 13j-2. The wireless stations 14a to 14j combine the acquired data frames, and send the combined data frames to the data aggregation station 12 in a second frequency band. The second frequency band is a frequency band different from the first frequency band. In the following description, the wireless stations 14a to 14j may be referred to as the wireless station(s) 14.

The data aggregation station 12 is a wireless device that receives data frames from the wireless stations 14a to 14j. The data aggregation station 12 aggregates the data frames from the wireless stations 14a to 14j, restores data from the data frames, and stores the data.

In the wireless system 15A according to the fourth embodiment, the configuration of the data aggregation station 12 is the same as that in the first embodiment illustrated in FIGS. 4 and 5. The configuration of the wireless station 13 is the same as the configuration of the wireless station 11 according to the first embodiment illustrated in FIGS. 2 and 3. However, unlike the wireless station 11 according to the first embodiment, the wireless station 13 does not have to have the function of receiving and relaying a data frame from another wireless station 13.

Figure 23:
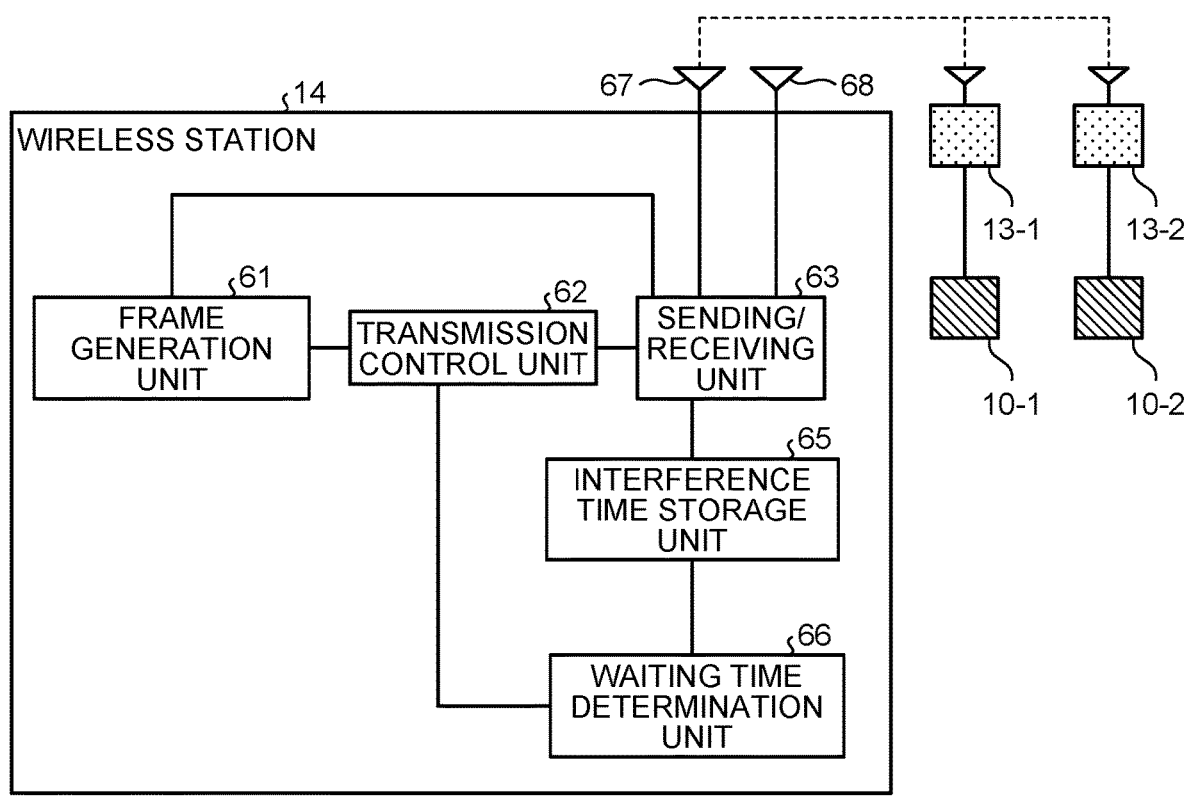
FIG. 23 is a block diagram illustrating an exemplary configuration of a wireless station according to the fourth embodiment.

The configuration of the wireless station 14 will be described. FIG. 23 is a block diagram illustrating an exemplary configuration of the wireless station 14 according to the fourth embodiment. The wireless station 14 includes a frame generation unit 61, a transmission control unit 62, a sending/receiving unit 63, an interference time storage unit 65, a waiting time determination unit 66, and antennas 67 and 68. Note that the antennas 67 and 68 in FIGS. 22 and 23 are contained in the wireless station 14 in practice.

The frame generation unit 61 may acquire data frames from the wireless stations 13-1 and 13-2 via the sending/receiving unit 63, in which case the frame generation unit 61 temporarily stores the data frames, combines the stored data frames at regular time intervals, and outputs the combined data frames to the transmission control unit 62. In addition, the frame generation unit 61 may acquire, from the sending/receiving unit 63, a data frame to be relayed to another wireless station 14, in which case the frame generation unit 61 changes the destination of the data frame and outputs the data frame to the transmission control unit 62. In the following description, a data frame that is a relay target in the wireless station 14 may be referred to as a first data frame. A data frame that the frame generation unit 61 newly generates by changing the destination of the first data frame may be referred to as a second data frame. A data frame that the frame generation unit 61 generates by combining data frames from the wireless stations 13-1 and 13-2 may be referred to as a third data frame. Data frames received at the sending/receiving unit 63 of the wireless station 14 include a first data frame that is a relay target addressed to that wireless station 14. The frame generation unit 61 generates a second data frame by changing the destination of the first data frame to the data aggregation station 12 or the wireless station 14 that serves as a relay destination.

The sending/receiving unit 63 sends, in the second frequency band via the antenna 68, the data frames acquired from the transmission control unit 62. The sending/receiving unit 63 also outputs, to the interference time storage unit 65, the data frames received via the antenna 68 in the second frequency band. At this time, the sending/receiving unit 63 of the wireless station 14 receives, in the second frequency band, data frames unrelated to that wireless station 14 as well as the data frames to be relayed to another wireless station 14. The sending/receiving unit 63 also receives data frames from the wireless stations 13-1 and 13-2 in the first frequency band via the antenna 67. The sending/receiving unit 63 outputs, to the frame generation unit 61 as well as to the interference time storage unit 65, the data frames to be relayed to another wireless station 14 and the data frames from the wireless stations 13-1 and 13-2.

The interference time storage unit 65 stores, as an interference time, the reception time of each data frame acquired from the sending/receiving unit 63. The reception time of a data frame is the time from when the sending/receiving unit 63 starts receiving the data frame to when the sending/receiving unit 63 terminates receiving the data frame. The interference time storage unit 65 outputs the interference time information to the waiting time determination unit 66.

The waiting time determination unit 66 determines a waiting time on the basis of the interference time acquired from the interference time storage unit 65. The waiting time is the time for which the wireless station 14 waits in relaying the data frame to another wireless station 14. The waiting time determination unit 66 outputs the waiting time information to the transmission control unit 62.

The transmission control unit 62 waits on the basis of the waiting time specified by the waiting time determination unit 66, and thereafter outputs, to the sending/receiving unit 63, the data frame acquired from the frame generation unit 61 to be relayed to another wireless station 14. That is, the transmission control unit 62 waits for the waiting time, and causes the sending/receiving unit 63 to send the second data frame. The transmission control unit 62 outputs, to the sending/receiving unit 63 without waiting, any data frame acquired from the frame generation unit 61 other than the data frames to be relayed to another wireless station 14. A data frame other than the data frames to be relayed to another wireless station 14 is a data frame generated by the frame generation unit 61 as a combination of the data frames acquired from the wireless stations 13-1 and 13-2. That is, the transmission control unit 62 causes the sending/receiving unit 63 to send the third data frame without waiting for the waiting time.

Figure 24:
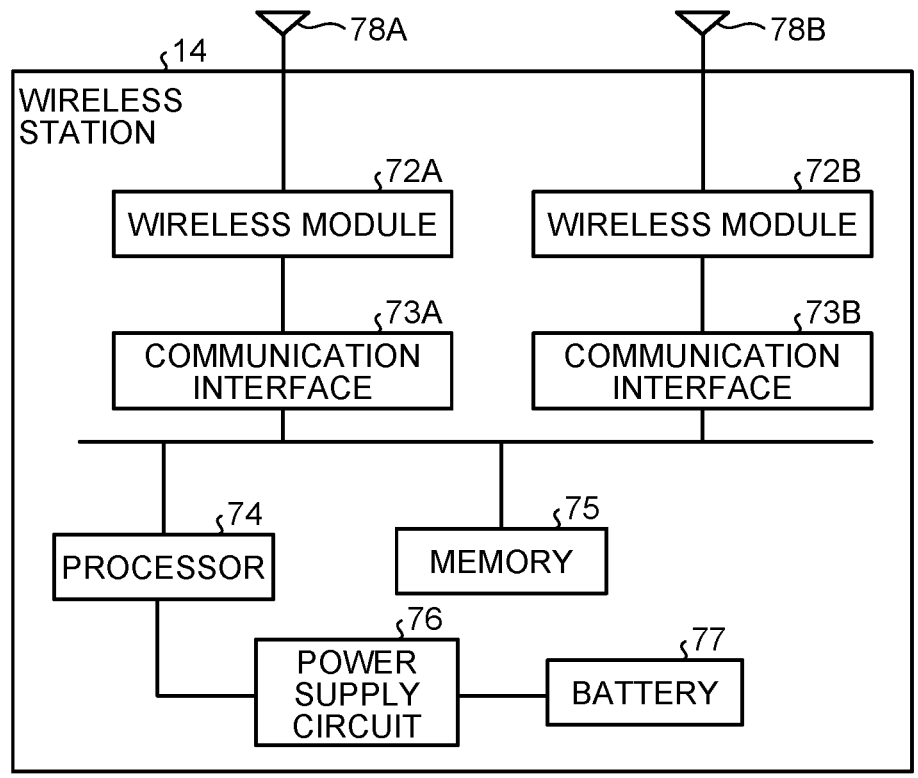
FIG. 24 is a diagram illustrating an exemplary hardware configuration of the wireless station according to the fourth embodiment.

FIG. 24 is a diagram illustrating an exemplary hardware configuration of the wireless station 14 according to the fourth embodiment. The wireless station 14 includes wireless modules 72A and 72B, communication interfaces 73A and 73B, a processor 74, a memory 75, a power supply circuit 76, a battery 77, and antenna elements 78A and 78B.

The wireless module 72A converts the data frame received by the antenna element 78A corresponding to the first frequency band into a format that can be read by the communication interface 73A, and outputs the data frame to the communication interface 73A. The wireless module 72A also converts the data frame acquired from the communication interface 73A into a format that can be sent from the antenna element 78A, and sends the data frame through the antenna element 78A. The communication interface 73A converts the data frame acquired from the wireless module 72A into a format that can be read by the processor 74, and outputs the data frame to the processor 74. The communication interface 73A also converts the data frame acquired from the processor 74 into a format that can be read by the wireless module 72A, and outputs the data frame to the wireless module 72A.

The wireless module 72B converts the data frame received by the antenna element 78B corresponding to the second frequency band into a format that can be read by the communication interface 73B, and outputs the data frame to the communication interface 73B. The wireless module 72B also converts the data frame acquired from the communication interface 73B into a format that can be sent from the antenna element 78B, and sends the data frame through the antenna element 78B. The communication interface 73B converts the data frame acquired from the wireless module 72B into a format that can be read by the processor 74, and outputs the data frame to the processor 74. The communication interface 73B also converts the data frame acquired from the processor 74 into a format that can be read by the wireless module 72B, and outputs the data frame to the wireless module 72B.

The processor 74 performs processing such as data frame generation and waiting time determination. The memory 75 temporarily stores information necessary for processing by the processor 74. The power supply circuit 76 and the battery 77 supply power to the wireless modules 72A and 72B, the communication interfaces 73A and 73B, the processor 74, the memory 75, and the antenna elements 78A and 78B.

In the wireless system 15A, the wireless station 13 generates and sends a data frame in the same manner as the wireless station 11 according to the first embodiment. In addition, the wireless station 14 relays a data frame and determines a waiting time in the same manner as the wireless station 11 according to the first embodiment.

Figure 25:
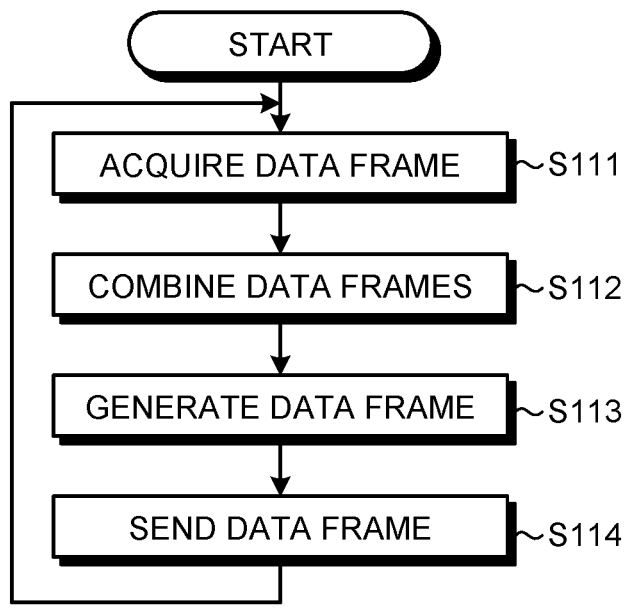
FIG. 25 is a flowchart illustrating how the wireless station generates and sends a data frame according to the fourth embodiment.

FIG. 25 is a flowchart illustrating how the wireless station 14 generates and sends a data frame according to the fourth embodiment. In the wireless station 14, the sending/receiving unit 63 acquires a data frame from the wireless station 13 (step S111). The sending/receiving unit 63 outputs the data frame to the frame generation unit 61. The frame generation unit 61 temporarily stores the data frame acquired from the sending/receiving unit 63, combines the stored data frames at regular time intervals (step S112), and generates a new data frame (step S113). The frame generation unit 61 outputs the generated data frame to the transmission control unit 62. The transmission control unit 62 outputs the acquired data frame to the sending/receiving unit 63 without waiting for the waiting time. The sending/receiving unit 63 sends the data frame in the second frequency band via the antenna 68 (step S114).

As described above, one or more wireless stations 13 acquires data from the target devices 10 and third data frames, and the sending/receiving unit 63 of the wireless station 14 receives the third data frames in the first frequency band from these one or more wireless stations 13. The frame generation unit 61 combines two or more of the third data frames received at the sending/receiving unit 63 to newly generate a third data frame addressed to the data aggregation station 12 or the wireless station 14 that serves as a relay destination. The sending/receiving unit 63 sends the third data frame newly generated by the frame generation unit 61 in the second frequency band different from the first frequency band.

Figure 26:
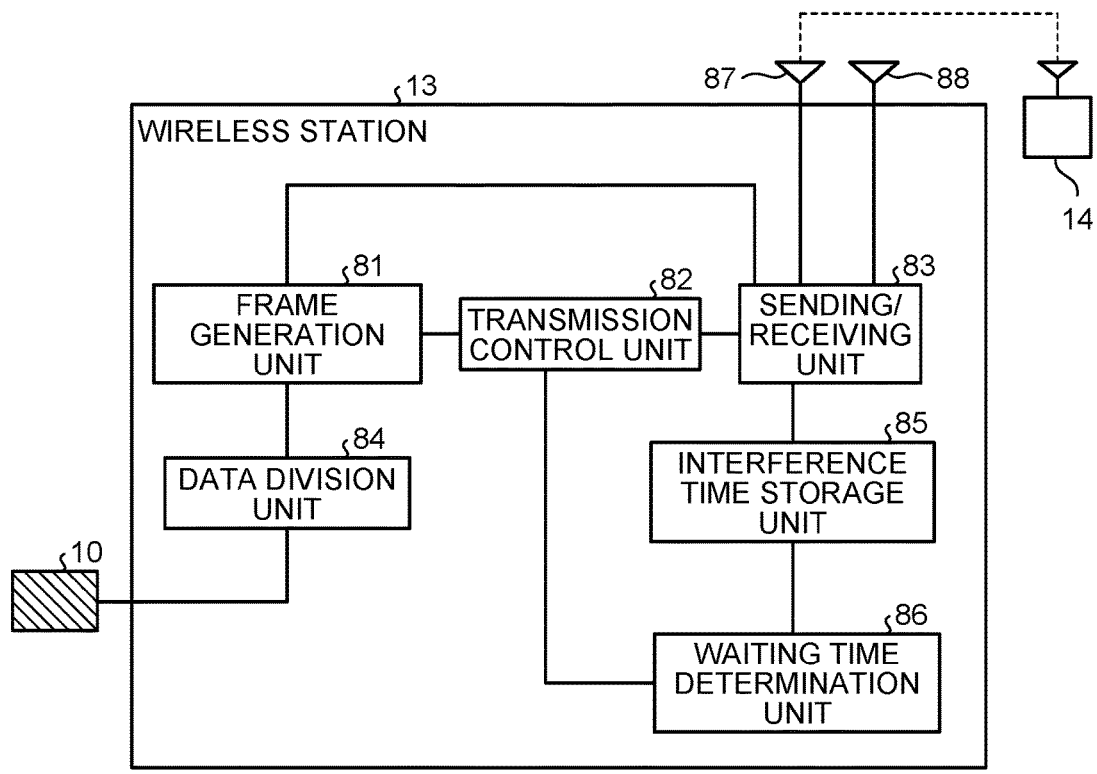
FIG. 26 is a block diagram illustrating an exemplary configuration of a different wireless station according to the fourth embodiment.
Figure 27:
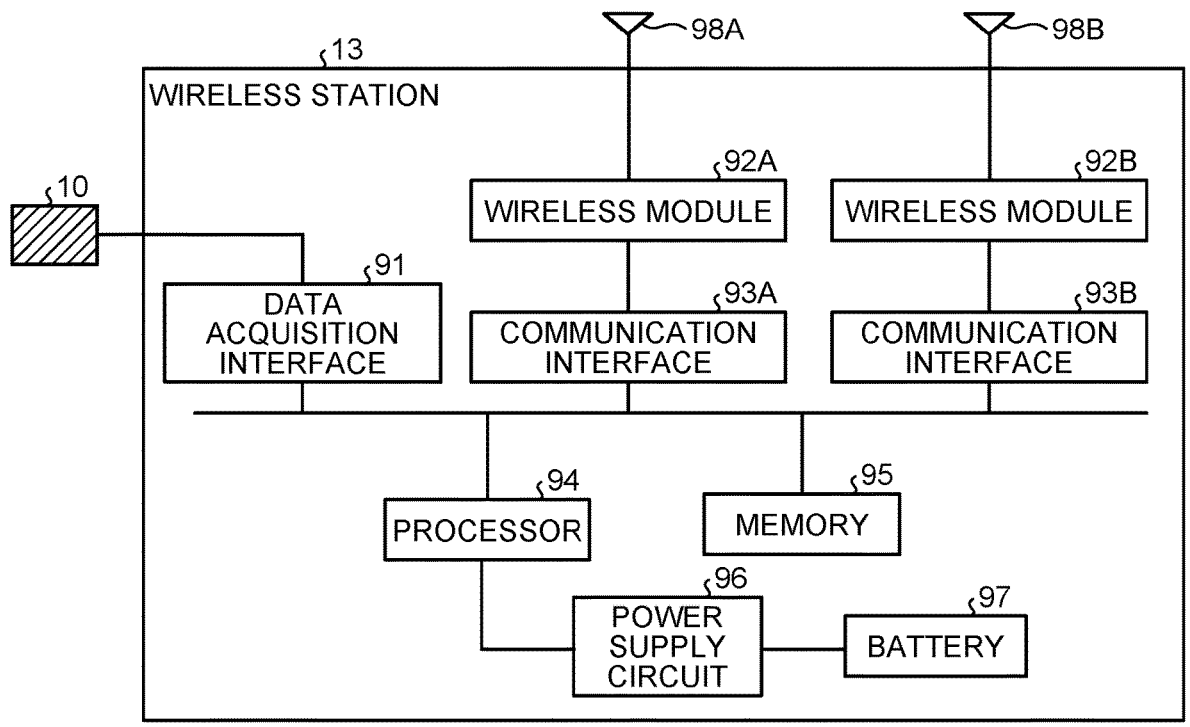
FIG. 27 is a diagram illustrating an exemplary hardware configuration of the different wireless station according to the fourth embodiment.

Note that the wireless station 13 may have the same function as the wireless station 14. FIG. 26 is a block diagram illustrating an exemplary configuration of the wireless station 13 according to the fourth embodiment. The wireless station 13 includes a frame generation unit 81, a transmission control unit 82, a sending/receiving unit 83, a data division unit 84, an interference time storage unit 85, a waiting time determination unit 86, and antennas 87 and 88. Note that the antennas 87 and 88 in FIG. 26 are contained in the wireless station 13 in practice. In the wireless station 13, the data division unit 84 is the same as the data division unit 24 of the wireless station 11 according to the first embodiment illustrated in FIG. 2, and the other components are the same as those of the wireless station 14 illustrated in FIG. 23. Note that the frame generation unit 81 has the function of the frame generation unit 21 of the wireless station 11 in addition to the function of the frame generation unit 61 of the wireless station 14. FIG. 27 is a diagram illustrating an exemplary hardware configuration of the wireless station 13 according to the fourth embodiment. The wireless station 13 includes a data acquisition interface 91, wireless modules 92A and 92B, communication interfaces 93A and 93B, a processor 94, a memory 95, a power supply circuit 96, a battery 97, and antenna elements 98A and 98B. In the wireless station 13, the data acquisition interface 91 is the same as the data acquisition interface 31 of the wireless station 11 according to the first embodiment illustrated in FIG. 3, and the other parts of the hardware configuration are the same as those of the wireless station 14 illustrated in FIG. 24.

In the wireless station 13, the data division unit 84 divides the data acquired from the target device 10. Using the data divided by the data division unit 84, the frame generation unit 81 generates a third data frame addressed to the corresponding wireless station 14. The sending/receiving unit 83 sends, in the first frequency band, the third data frame generated by the frame generation unit 81 to the wireless station 14 that combines third data frames to newly generate a third data frame addressed to the data aggregation station 12 or the wireless station 14 that serves as a relay destination. In the second frequency band, the sending/receiving unit 83 receives a first data frame and sends, or relays, a second data frame.

As described above, according to the present embodiment, the wireless system 15A uses a plurality of frequency bands in the system. As a result, the wireless system 15A achieves higher transmission efficiency than when one frequency band is used. Although FIGS. 22 to 24 depict an example in which the wireless system 15A uses two frequency bands together, the wireless system 15A can use three or more frequency bands together.

The wireless station according to the disclosure can achieve the effect of autonomously avoiding the interference between the wireless stations during the frame relay.

The configurations described in the above-mentioned embodiments indicate examples. The configurations can be combined with another well-known technique, and some of the configurations can be omitted or changed in a range not departing from the gist.

What is claimed is:

1. A wireless station comprising:
   sending and receiving circuitry to receive data frames sent from another wireless station, the received data frames including a first data frame to be relayed to a further wireless station, the first data frame being referred to as a relay target;
   interference time storage circuitry to store an interference time that is a time from when the sending and receiving circuitry starts receiving each of the data frames to when the sending and receiving circuitry terminates receiving the data frames;
   waiting time determination circuitry to determine a waiting time on a basis of the interference time;
   frame generation circuitry to generate a second data frame by changing a destination of the first data frame to a data aggregation station that aggregates the data frames or to a wireless station that serves as a relay destination; and
   transmission control circuitry to wait for the waiting time and cause the sending and receiving circuitry to send the second data frame.

2. The wireless station according to claim 1, wherein
   the sending and receiving circuitry measures a radio field intensity of a data frame sent from the other wireless station, and
   the transmission control circuitry waits for the waiting time, and, when the radio field intensity is higher than or equal to a prescribed threshold, further waits until the radio field intensity falls below the threshold.

3. The wireless station according to claim 1, further comprising
   data division circuitry to divide data acquired from a target device, wherein
   the frame generation circuitry generates a third data frame, using the data divided by the data division circuitry, the third data frame being addressed to the data aggregation station or the wireless station that serves as the relay destination, and
   the transmission control circuitry causes the sending and receiving circuitry to send the third data frame without waiting for the waiting time.

4. The wireless station according to claim 3, wherein
   the sending and receiving circuitry measures a radio field intensity of a data frame sent from the other wireless station,
   the frame generation circuitry generates a first control frame including information on the measured radio field intensity, and
   the transmission control circuitry causes the sending and receiving circuitry to send the first control frame without waiting for the waiting time.

5. The wireless station according to claim 4, wherein
   the sending and receiving circuitry receives a second control frame from the data aggregation station as a response to a first control frame sent by a wireless station to which the third data frame is to be sent, the second control frame specifying a generable data frame amount, and
   on the basis of the data frame amount specified in the second control frame, the frame generation circuitry determines a data frame amount in which to generate the third data f r am e.

6. The wireless station according to claim 1, wherein
one or more wireless stations acquire data from a target device and generate third data frames,
the sending and receiving circuitry receives, in a first frequency band, the third data frames generated by the one or more wireless stations, from the one or more wireless stations, and
the frame generation circuitry combines two or more of the third data frames received at the sending and receiving circuitry to newly generate a third data frame addressed to the data aggregation station or the wireless station that serves as the relay destination.

7. The wireless station according to claim 6, wherein
the sending and receiving circuitry sends in a second frequency band, the third data frame newly generated by the frame generation circuitry, the second frequency band being different from the first frequency band.

8. The wireless station according to claim 1, further comprising
a data division circuitry to divide data acquired from a target device, wherein
the frame generation circuitry generates a third data frame, using the data divided by the data division circuitry, the third data frame being addressed to the data aggregation station or the wireless station that serves as the relay destination, and
the sending and receiving circuitry sends the third data frame in a first frequency band to a wireless station that combines a plurality of the third data frames to newly generate a third data frame addressed to the data aggregation station or the wireless station that serves as the relay destination, and
the sending and receiving circuitry sends the second data frame in a second frequency band.

9. A data aggregation station comprising:
sending and receiving circuitry to receive a second data frame sent from a first wireless station, or a third data frame sent from a second wireless station;
data restoration circuitry to restore data from the second data frame or the third data frame; and
data storage circuitry to store the data restored by the data restoration circuitry, wherein
the first wireless station to send the second data frame comprises:
sending and receiving circuitry to receive data frames sent from another wireless station, the received data frames including a first data frame to be relayed to a further wireless station, the first data frame being referred to as a relay target;
interference time storage circuitry to store an interference time that is a time from when the sending and receiving circuitry starts receiving each of the data frames to when the sending and receiving circuitry terminates receiving the data frames;
waiting time determination circuitry to determine a waiting time on a basis of the interference time;
frame generation circuitry to generate the second data frame by changing a destination of the first data frame to the data aggregation station that aggregates the data frames or to a wireless station that serves as a relay destination; and
transmission control circuitry to wait for the waiting time and cause the sending and receiving circuitry to send the second data frame, and wherein
the second wireless station to send the third data frame comprises:
sending and receiving circuitry to receive data frames sent from another wireless station, the received data frames including a first data frame to be relayed to a further wireless station, the first data frame being referred to as a relay target;
interference time storage circuitry to store an interference time that is a time from when the sending and receiving circuitry starts receiving each of the data frames to when the sending and receiving circuitry terminates receiving the data frames;
waiting time determination circuitry to determine a waiting time on a basis of the interference time;
frame generation circuitry to generate a second data frame by changing a destination of the first data frame to the data aggregation station that aggregates the data frames or to a wireless station that serves as a relay destination;
transmission control circuitry to wait for the waiting time and cause the sending and receiving circuitry to send the second data frame; and
data division circuitry to divide data acquired from a target device, wherein
the frame generation circuitry generates the third data frame, using the data divided by the data division circuitry, the third data frame being addressed to the data aggregation station or the wireless station that serves as the relay destination, and
the transmission control circuitry causes the sending and receiving circuitry to send the third data frame without waiting for the waiting time.

10. The data aggregation station according to claim 9, further comprising:
control information determination circuitry to determine a data frame amount generable in the wireless station on the basis of information on a radio field intensity of a data frame measured by the wireless station, the information on the measured radio field intensity being included in a first control frame received at the sending and receiving circuitry; and
frame generation circuitry to generate a second control frame that specifies the data frame amount determined by the control information determination circuitry, wherein
the sending and receiving circuitry sends the second control frame to the wireless station.

11. A wireless system comprising a wireless station and a data aggregation station, wherein
the wireless station comprises:
sending and receiving circuitry to receive data frames sent from another wireless station, the received data frames including a first data frame to be relayed to a further wireless station, the first data frame being referred to as a relay target;
interference time storage circuitry to store an interference time that is a time from when the sending and receiving circuitry starts receiving each of the data frames to when the sending and receiving circuitry terminates receiving the data frames;
waiting time determination circuitry to determine a waiting time on a basis of the interference time;
frame generation circuitry to generate a second data frame by changing a destination of the first data frame to a data aggregation station that aggregates the data frames or to a wireless station that serves as a relay destination; and
transmission control circuitry to wait for the waiting time and cause the sending and receiving circuitry to send the second data frame, and wherein the data aggregation station comprising:
sending and receiving circuitry to receive a second data frame sent from a first wireless station, or a third data frame sent from a second wireless station;
data restoration circuitry to restore data from the second data frame or the third data frame; and
data storage circuitry to store the data restored by the data restoration circuitry, wherein
the first wireless station to send the second data frame comprises:
sending and receiving circuitry to receive data frames sent from another wireless station, the received data frames including a first data frame to be relayed to a further wireless station, the first data frame being referred to as a relay target;
interference time storage circuitry to store an interference time that is a time from when the sending and receiving circuitry starts receiving each of the data frames to when the sending and receiving circuitry terminates receiving the data frames;
waiting time determination circuitry to determine a waiting time on a basis of the interference time;
frame generation circuitry to generate the second data frame by changing a destination of the first data frame to the data aggregation station that aggregates the data frames or to a wireless station that serves as a relay destination; and
transmission control circuitry to wait for the waiting time and cause the sending and receiving circuitry to send the second data frame, and wherein
the second wireless station to send the third data frame comprises:
sending and receiving circuitry to receive data frames sent from another wireless station, the received data frames including a first data frame to be relayed to a further wireless station, the first data frame being referred to as a relay target;
interference time storage circuitry to store an interference time that is a time from when the sending and receiving circuitry starts receiving each of the data frames to when the sending and receiving circuitry terminates receiving the data frames;
waiting time determination circuitry to determine a waiting time on a basis of the interference time;
frame generation circuitry to generate a second data frame by changing a destination of the first data frame to the data aggregation station that aggregates the data frames or to a wireless station that serves as a relay destination;
transmission control circuitry to wait for the waiting time and cause the sending and receiving circuitry to send the second data frame; and
data division circuitry to divide data acquired from a target device, wherein
the frame generation circuitry generates the third data frame, using the data divided by the data division circuitry, the third data frame being addressed to the data aggregation station or the wireless station that serves as the relay destination, and
the transmission control circuitry causes the sending and receiving circuitry to send the third data frame without waiting for the waiting time.

12. A transmission control method for a wireless station, the transmission control method comprising:
receiving data frames sent from another wireless station, the received data frames including a first data frame to be relayed to a further wireless station, the first data frame being referred to as a relay target;
storing an interference time that is a time from start of reception of each of the data frames to termination of the reception of the data frames;
determining a waiting time on a basis of the interference time;
generating a second data frame by changing a destination of the first data frame to a data aggregation station that aggregates the data frames or a wireless station that serves as a relay destination; and
waiting for the waiting time and sending the second data frame.

13. The transmission control method for a wireless station according to claim 12, wherein
receiving the received data frames comprises measuring a radio field intensity of a data frame sent from the other wireless station, and
waiting for the waiting time and sending the second data frame comprises waiting for the waiting time, and when the radio field intensity is higher than or equal to a prescribed threshold, further waiting until the radio field intensity falls below the threshold.

14. The transmission control method for a wireless station according to claim 12, comprising:
dividing data acquired from a target device;
generating a third data frame, using the divided data, the third data frame being addressed to the data aggregation station or the wireless station that serves as the relay destination; and
sending the third data frame without waiting for the waiting time.

15. The transmission control method for a wireless station according to claim 14, comprising:
measuring a radio field intensity of a data frame sent from the other wireless station;
generating a first control frame including information on the measured radio field intensity; and
sending the first control frame without waiting for the waiting time.

16. The transmission control method for a wireless station according to claim 15, comprising
receiving a second control frame from the data aggregation station as a response to a first control frame sent by a wireless station to which the third data frame is to be sent, the second control frame specifying a generable data frame amount; and
on the basis of the data frame amount specified in the second control frame, determining a data frame amount in which to generate the third data frame.

17. The transmission control method for a wireless station according to claim 12, wherein one or more wireless stations acquire data from a target device and generate third data frames, the method comprising:
receiving, in a first frequency band, the third data frames generated by the one or more wireless stations, from the one or more wireless stations; and
combining two or more of the third data frames to newly generate a third data frame addressed to the data aggregation station or the wireless station that serves as the relay destination.

18. The transmission control method for a wireless station according to claim 17, comprising
sending, in a second frequency band, the newly generated third data frame, the second frequency band being different from the first frequency band.

19. The transmission control method for a wireless station according to claim 12, comprising:
dividing data acquired from a target device;
generating a third data frame, using the divided data, the third data frame being addressed to the data aggregation station or the wireless station that serves as the relay destination;
sending the third data frame in a first frequency band to a wireless station that combines a plurality of the third data frames to newly generate a third data frame addressed to the data aggregation station or the wireless station that serves as the relay destination; and
sending the second data frame in a second frequency band.

20. A transmission control method for a data aggregation station, the transmission control method comprising:
receiving a second data frame sent from a first wireless station, or a third data frame sent from a second wireless station;
restoring data from the second data frame or the third data frame; and
storing the restored data, wherein
the first wireless station sends the second data frame by using a transmission control method comprising:
receiving data frames sent from another wireless station, the received data frames including a first data frame to be relayed to a further wireless station, the first data frame being referred to as a relay target;
storing an interference time that is a time from start of reception of each of the data frames to termination of the reception of the data frames;
determining a waiting time on a basis of the interference time;
generating the second data frame by changing a destination of the first data frame to a data aggregation station that aggregates the data frames or a wireless station that serves as a relay destination; and
waiting for the waiting time and sending the second data frame, and wherein
the second wireless station sends the third data frame by using a second transmission control method comprising:
receiving data frames sent from another wireless station, the received data frames including a first data frame to be relayed to a further wireless station, the first data frame being referred to as a relay target;
storing an interference time that is a time from start of reception of each of the data frames to termination of the reception of the data frames;
determining a waiting time on a basis of the interference time;
generating the second data frame by changing a destination of the first data frame to the data aggregation station that aggregates the data frames or a wireless station that serves as a relay destination;
waiting for the waiting time and sending the second data frame;
dividing data acquired from a target device;
generating the third data frame, using the divided data, the third data frame being addressed to the data aggregation station or the wireless station that serves as the relay destination; and
sending the third data frame without waiting for the waiting time.

21. The transmission control method for a data aggregation station according to claim 20, comprising:
determining a data frame amount generable in the wireless station on the basis of information on a radio field intensity of a data frame measured by the wireless station, the information on the measured radio field intensity being included in a first control frame received;
generating a second control frame that specifies the determined data frame amount; and
sending the second control frame to the wireless station.

22. A control circuit for controlling a wireless station, the control circuit causing the wireless station to:
receive data frames sent from another wireless station, the received data frames including a first data frame to be relayed to a further wireless station, the first data frame being referred to as a relay target;
store an interference time that is a time from start of reception of each of the data frames to termination of the reception of the data frames;
determine a waiting time on a basis of the interference time;
generate a second data frame by changing a destination of the first data frame to a data aggregation station that aggregates the data frames or to a wireless station that serves as a relay destination; and
wait for the waiting time and send the second data frame.

23. A control circuit for controlling a data aggregation station, the control circuit causing the data aggregation station to:
receive a second data frame sent by a wireless station controlled by a control circuit for controlling the wireless station;
restore data from the second data frame; and
store the restored data, wherein
the control circuit for controlling the wireless station causes the wireless station to:
receive data frames sent from another wireless station, the received data frames including a first data frame to be relayed to a further wireless station, the first data frame being referred to as a relay target;
store an interference time that is a time from start of reception of each of the data frames to termination of the reception of the data frames;
determine a waiting time on a basis of the interference time;
generate the second data frame by changing a destination of the first data frame to the data aggregation station that aggregates the data frames or to a wireless station that serves as a relay destination; and
wait for the waiting time and send the second data frame.

24. A non-transitory storage medium storing therein a program for controlling a wireless station, the program causing the wireless station to:
receive data frames sent from another wireless station, the received data frames including a first data frame to be relayed to a further wireless station, the first data frame being referred to as a relay target;
store an interference time that is a time from start of reception of each of the data frames to termination of the reception of the data frames;
determine a waiting time on a basis of the interference time;
generate a second data frame by changing a destination of the first data frame to a data aggregation station that aggregates the data frames or to a wireless station that serves as a relay destination; and
wait for the waiting time and send the second data frame.

25. A non-transitory storage medium storing therein a program for controlling a data aggregation station, the program causing the data aggregation station to:
- receive a second data frame sent by a wireless station controlled by a program stored in a non-transitory storage medium storing therein the program for controlling the wireless station;
- restore data from the second data frame; and
- store the restored data, wherein
  - the program for controlling the wireless station causes the wireless station to:
  - receive data frames sent from another wireless station, the received data frames including a first data frame to be relayed to a further wireless station, the first data frame being referred to as a relay target;
- store an interference time that is a time from start of reception of each of the data frames to termination of the reception of the data frames;
- determine a waiting time on a basis of the interference time;
- generate the second data frame by changing a destination of the first data frame to the data aggregation station that aggregates the data frames or to a wireless station that serves as a relay destination; and
  - wait for the waiting time and send the second data frame.

\* \* \* \* \*